(12) United States Patent
Nagy et al.

(10) Patent No.: US 7,572,427 B2
(45) Date of Patent: Aug. 11, 2009

(54) CATALYST SUPPORTS AND CARBON NANOTUBES PRODUCED THEREON

(75) Inventors: Janos B. Nagy, Jambes (BE); Narasimaiah Nagaraju, Bangalore (IN); Isabelle Willems, Soye (BE); Antonio Fonseca, Louvain-La-Neuve (BE)

(73) Assignee: Facultes Universitaires Notre-Dame De La Paix, Namur (BE)

( * ) Notice: Subject to any disclaimer, the term of this patent is extended or adjusted under 35 U.S.C. 154(b) by 936 days.

(21) Appl. No.: 10/481,709

(22) PCT Filed: Jul. 3, 2002

(86) PCT No.: PCT/BE02/00113

§ 371 (c)(1),
(2), (4) Date: Jun. 25, 2004

(87) PCT Pub. No.: WO03/004410

PCT Pub. Date: Jan. 16, 2003

(65) Prior Publication Data

US 2004/0241080 A1    Dec. 2, 2004

(30) Foreign Application Priority Data

Jul. 3, 2001    (EP)    .................... 01870150
Dec. 4, 2001    (EP)    .................... 01870268

(51) Int. Cl.
*D01C 5/00*    (2006.01)
*B01J 23/00*    (2006.01)
*B01J 21/00*    (2006.01)
*B01J 20/00*    (2006.01)
*B01J 29/00*    (2006.01)

(52) U.S. Cl. .................. 423/447.3; 502/240; 502/300; 502/302; 502/303; 502/304; 502/327; 502/332; 502/333; 502/334; 502/335; 502/336; 502/337; 502/338; 502/339; 502/349; 502/350; 502/351; 502/352; 502/353; 502/354; 502/355; 502/415; 502/439

(58) Field of Classification Search .............. 502/240, 502/300–355, 415, 439; 423/447.3
See application file for complete search history.

(56) References Cited

U.S. PATENT DOCUMENTS 4,093,561 A * 6/1978 Nishikawa et al. .......... 502/336
(Continued)

FOREIGN PATENT DOCUMENTS

DE    4025931 A1    2/1991
(Continued)

OTHER PUBLICATIONS

Biro et al., "Catalyst traces and other impurities in chemically purified carbon nanotubes grown by CVD," (2002) *Materials Science and Engineering C*, vol. 19, pp. 9-13.
(Continued)

*Primary Examiner*—Cam N. Nguyen
(74) *Attorney, Agent, or Firm*—Knobbe Martens Olsen & Bear LLP

(57) ABSTRACT

The present invention is related to single and/or multiple-wall carbon nanotubes which may contain interstitial metals obtainable by a preparation process. The process includes a catalytic step using a catalytic system which includes a catalyst and a support. The support comprises hydroxides and/or carbonates or mixtures thereof with or without metal oxides. The present invention is also related to carbon fibers obtainable by said preparation process. The present invention also pertains in particular to said catalytic system and to said preparation process. Another aspect concerns the use of the nanotubes and of the catalytic system according to the invention.

6 Claims, 6 Drawing Sheets

U.S. PATENT DOCUMENTS

| | | | | |
|---|---|---|---|---|
| 4,096,096 | A | * | 6/1978 | Nishikawa et al. .......... 502/338 |
| 5,047,379 | A | * | 9/1991 | Alyea et al. .................... 502/79 |
| 5,482,601 | A | * | 1/1996 | Ohshima et al. ............ 204/173 |
| 5,780,101 | A | * | 7/1998 | Nolan et al. ................. 427/216 |
| 5,892,102 | A | | 4/1999 | Mikami et al. |
| 6,333,016 | B1 | * | 12/2001 | Resasco et al. .......... 423/447.3 |
| 6,518,218 | B1 | * | 2/2003 | Sun et al. ..................... 502/259 |
| 2002/0034676 | A1 | * | 3/2002 | Kim et al. ...................... 429/44 |
| 2002/0165091 | A1 | * | 11/2002 | Resasco et al. ............. 502/255 |

FOREIGN PATENT DOCUMENTS

| | | |
|---|---|---|
| EP | 0 619 388 | 10/1994 |
| EP | 0270666 B1 | 8/1996 |
| EP | 0451208 B1 | 3/2000 |
| JP | 19810011835 | 1/1981 |
| JP | 2001062299 A2 | 3/2001 |
| KR | 100251294 B1 | 1/2000 |
| RU | 19980105232 | 3/1998 |
| WO | WO 00/17102 | 3/2000 |
| WO | WO 01/49599 A2 | 7/2001 |

OTHER PUBLICATIONS

Cassell et al. "Large scale CVD synthesis of single-walled carbon nanotubes," (1999) *J. Phys. Chem. B*, vol. 103, pp. 6484-6492.

Che et al., "Chemical vapor deposition bases synthesis of carbon nanotubes and nanofibers using a template method," (1998) *Chem. Mater.*, vol. 10, pp. 260-267.

Dujardin et al., "Interstitial metallic residues in purified single shell carbon nanotubes," (2000) *Solid State Communications*, vol. 114, pp. 543-546.

Fonseca et al., "Synthesis of single- and multi-wall carbon nanotubes over supported catalysts," (1998) *Applied Physics A*, vol. 67, pp. 11-22.

Sinha et al., "A novel approach to bulk synthesis of carbon nanotubes filled with metal by a catalytic chemical vapor deposition method," (2000) *Chemical Physics Letters*, vol. 332, pp. 455-460.

Avdeeva, L.B. et al. 1996 "Coprecipitated Ni-alumina and Ni-Cu-alumina catalysts of methane decomposition and carbon deposition. II. Evolution of the catalysts in reaction" Applied *Catalysis A: General* 141:117-129.

Adeeva, L.B. et al. 1999 "Cobalt catalysts of methane decomposition: accumulation of the filamentous carbon" *Applied Catalysis A: General* 177:43-51.

Li, Y. et al. 1997 "Catalytic growth of carbon fibers from methane on a nickel-alumina composite catalyst prepared from Feitknecht compound precursor" *Applied Catalysis A: General* 163:45-57.

Vander Wall, R.L. and Tichich, T.M. 2001 "Comparative flame and furnace synthesis of single-walled carbon nanotubes" *Chemical Physics Letters* 336:24-32.

* cited by examiner

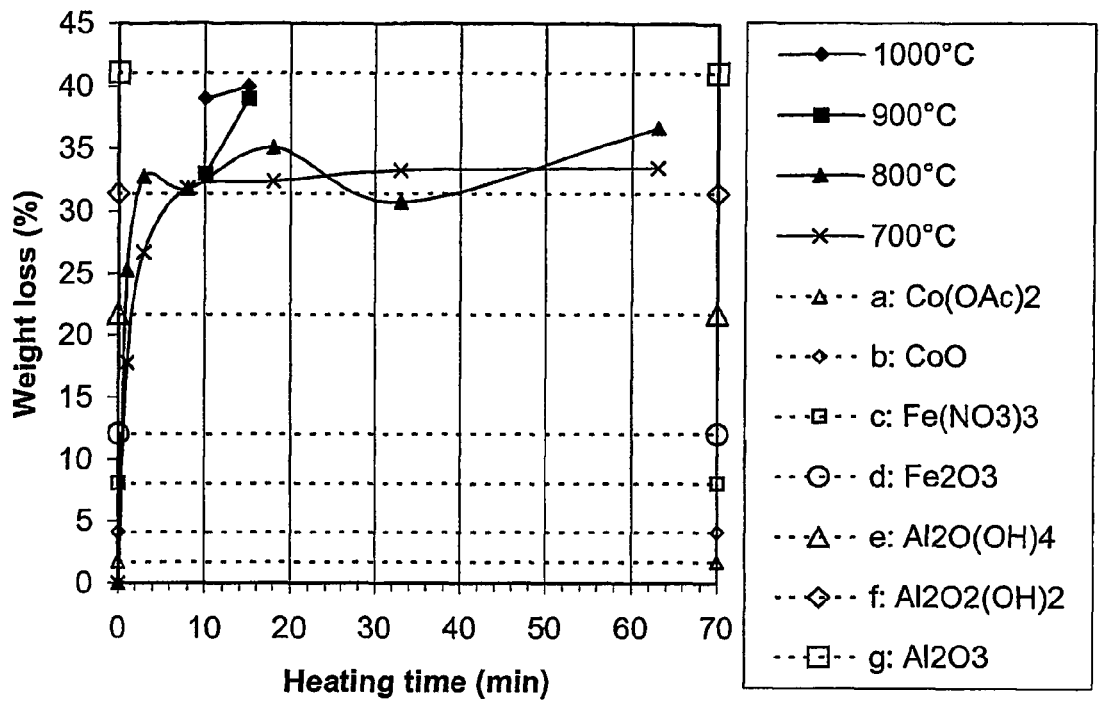
FIG. 1: SCA2/Nitrogen
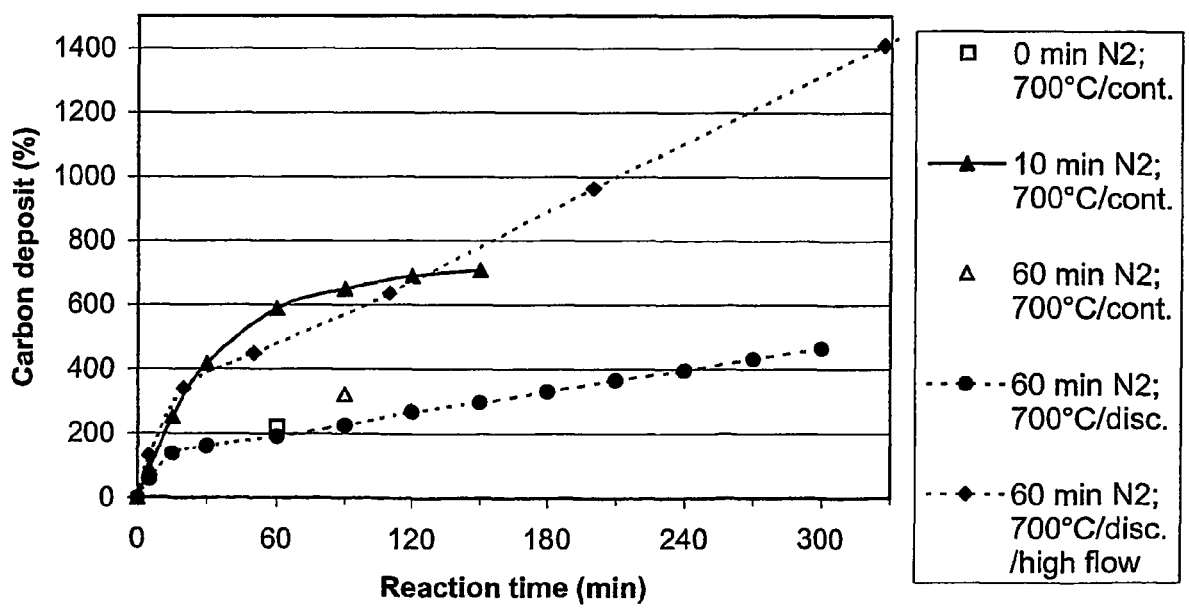
FIG. 2: SCA2/Acetylene/Nitrogen

Fig. 5 : SCA2/Ethylene/Nitrogen
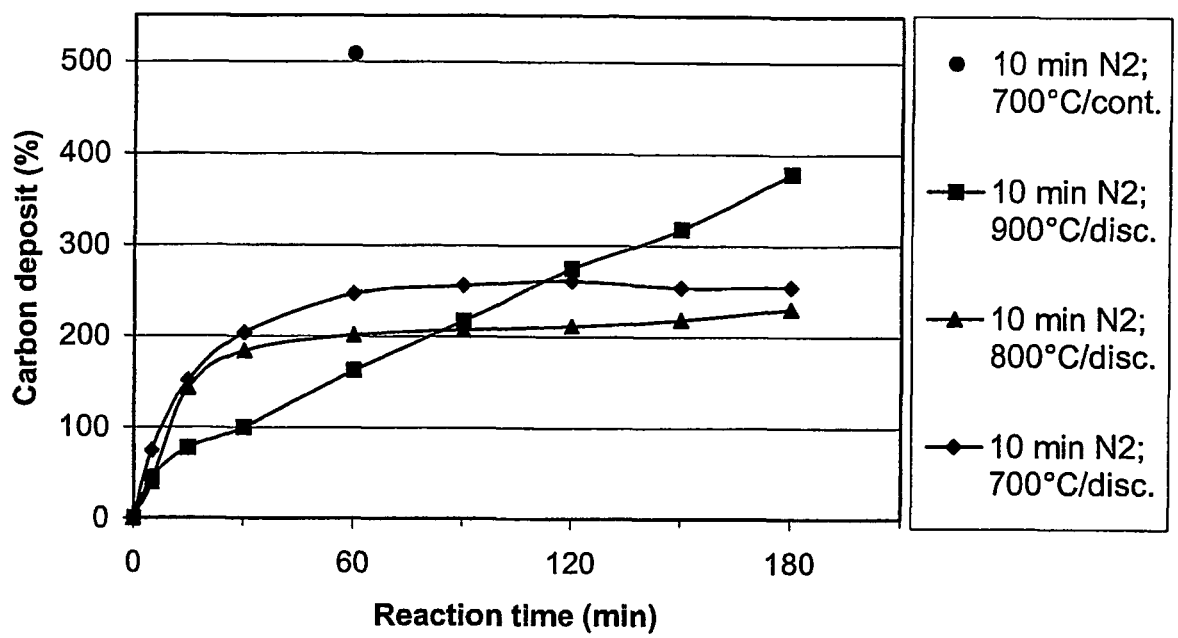
Fig. 6 : SCA2/Ethane/Nitrogen
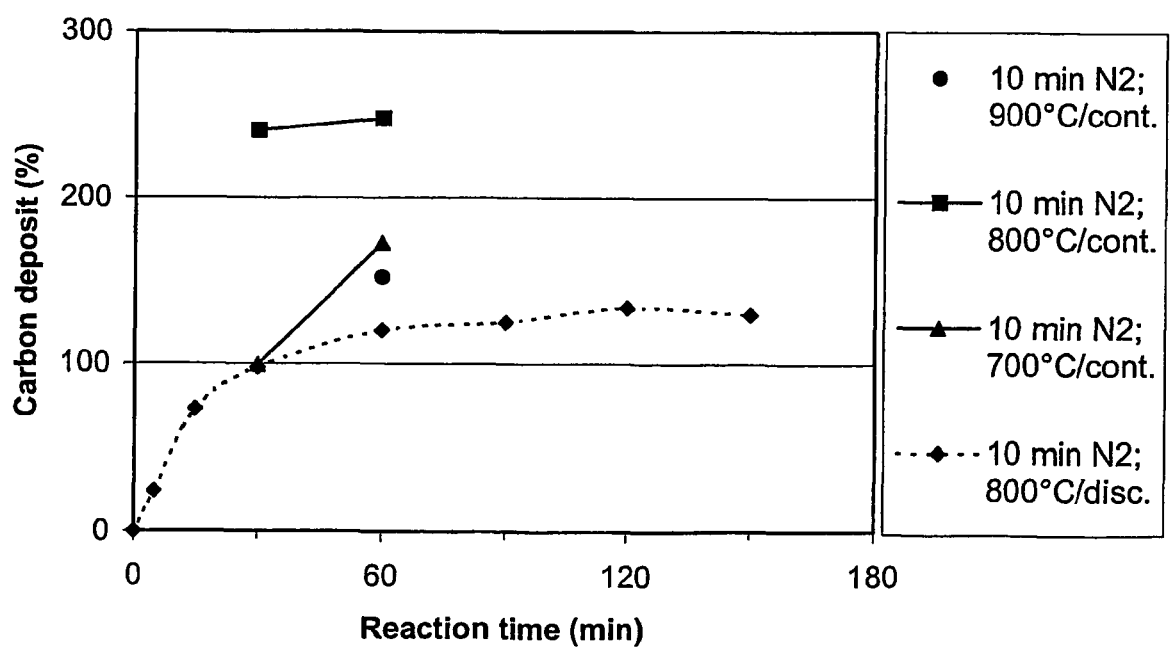

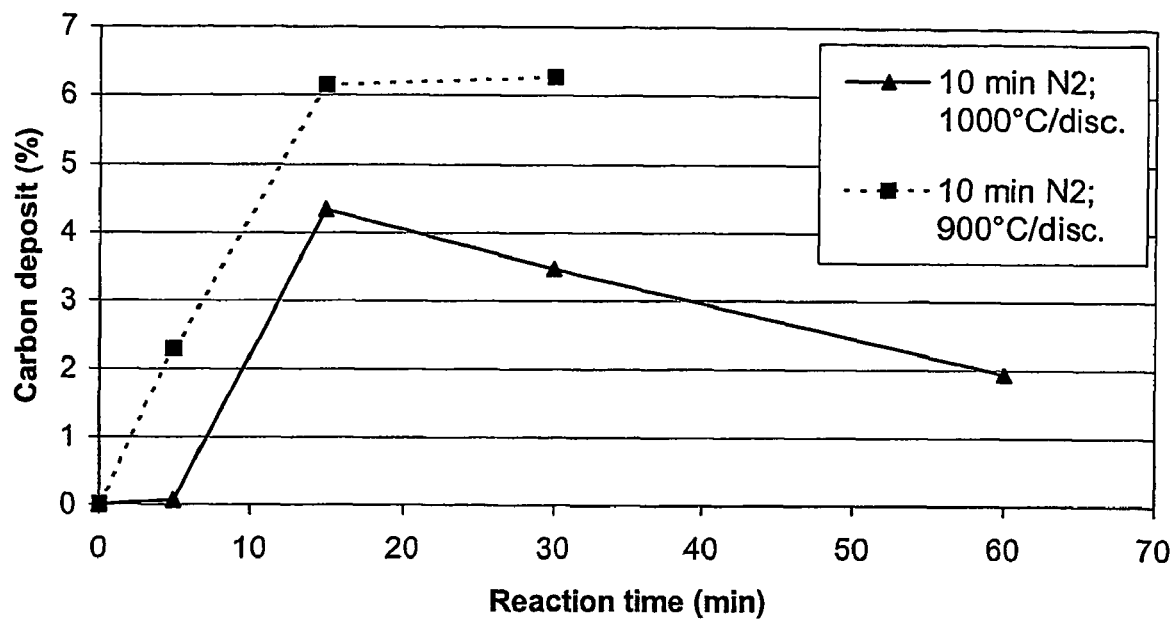
Fig.7 : SCA2/Methane/Nitrogen
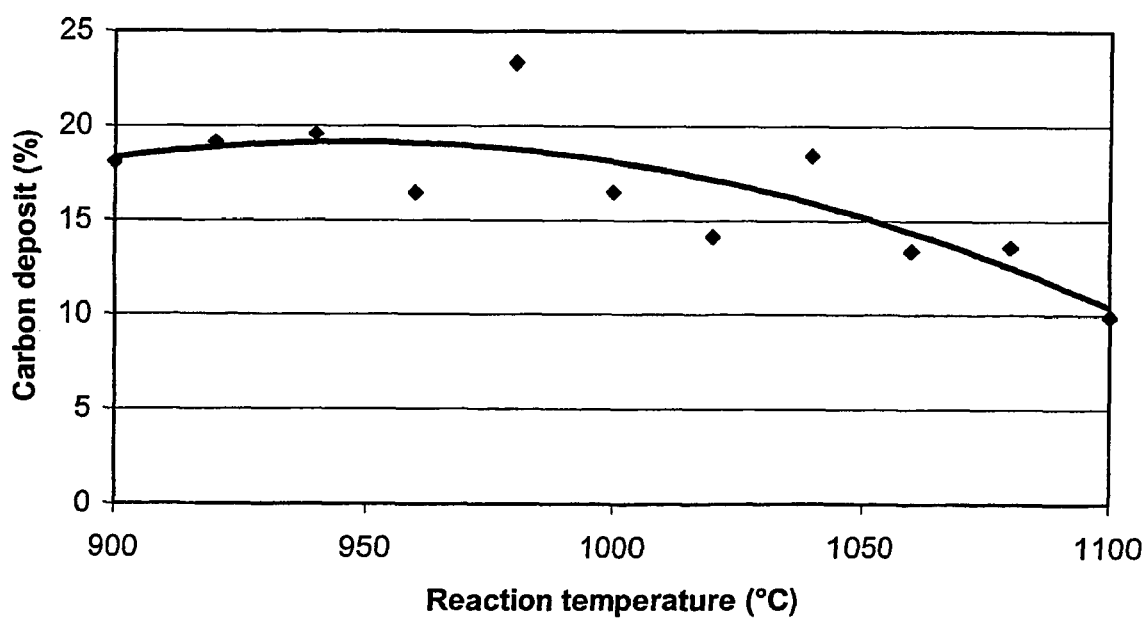
Fig. 8 : SCA2/Methane/Hydrogen

CATALYST SUPPORTS AND CARBON NANOTUBES PRODUCED THEREON

RELATED APPLICATIONS

This application represents the U.S. National Phase of International Application No. PCT/BE02/00113 filed Jul. 3, 2002, designating the United States of America and published in English, which claims the benefit of priority of European Application No. 01870150.8 filed Jul. 3, 2001, and European Application No. 01870268.8 filed Dec. 4, 2001, which are hereby expressly incorporated by reference in their entireties.

FIELD OF THE INVENTION

The present invention is related to the field of single and multiple-wall carbon nanotubes.

More precisely, the present invention is related to hydroxide and carbonate-based supported catalysts for carbon nanotube preparation.

STATE OF THE ART

Carbon nanotubes were first observed by Iijima in 1991 (S. Iijima, Nature 354, 56-58 (1991)).

Carbon nanotubes can be produced for example, by arc discharge, by laser ablation or by catalytic decomposition of hydrocarbons.

The production of carbon nanotubes by the arc discharge and the laser ablation techniques can be carried out either in the absence of catalysts to produce multi-wall nanotubes (MWNTs) or in the presence of catalysts to produce both MWNTs and single-wall nanotubes (SWNTs), together with soot, amorphous carbon and encapsulated metal nanoparticles. The catalyst comprises generally metals, metal oxides or other metal derivatives or mixtures thereof. Examples of those metals are ie., Co, Fe, Ni, V, Mo, Sn, . . . .

The invention discloses the preparation of carbon nanotubes by the catalytic decomposition of hydrocarbons, a technique called CCVD (Catalytic Carbon Vapour Deposition), carried out in the presence of catalysts to produce both MWNTs and SWNTs. Soot and encapsulated metal nanoparticles are the other by-products. The hydrocarbon can be acetylene, ethylene, butane, propane, ethane, methane or any other gaseous or volatile carbon containing compound. The catalyst, for example transition metal, is generally, either pure or dispersed on a support.

The presence of a support for the catalyst affects the activity of the catalysts tremendously in the formation of carbon nanotubes. The selectivity of the catalyst for the production of nanotubes also depends on the type of catalyst support interaction.

The most common supports used to prepare supported catalyst for carbon nanotubes production are oxides [i.e., silica (P. Piedigrosso et al., *Phys. Chem. Chem. Phys.* 2, 163-170 (2000)), alumina (I. Willems et al., *Chem. Phys. Lett.* 317, 71-76 (2000)), silica-alumina mixtures (Kukovecz, A. et al., *Phys. Chem. Chem. Phys.* 2, 3071-3076 (2000)), magnesium oxide (J.-F. Colomer et al., *Chem. Phys. Lett.* 317, 83-89 (2000)), calcium oxide (C. Ping et al., CN 1170631 A 19980121), titanium oxide (V. Curtis, et al., Book of Abstracts, 219$^{th}$ ACS National Meeting, San Francisco, Calif., Mar. 26-30, 2000), cerium oxide (L. Ji et al., *Appl. Chem.* 72, 327-331 (2000)), zeolites (K. Hernadi et al., *Zeolites* 17, 416-423 (1996)), clays (A. Fonseca et al., *Appl. Phys. A* 67, 11-22 (1998)), spinels (A. Govindaraj et al., *J. Mater. Res.* 14, 2567-2576 (1999)), ALPOs (Wang, N. et al., *Nature* 408, 50-51 (2000))] and graphite (V. Ivanov et al., *Carbon* 33, 1727-1738 (1995)).

The use of porous materials (i.e., silica, alumina, zeolites, etc.) as supports for catalysts, contaminates the carbon nanotubes produced thereon with a large amount of soot and amorphous carbon, while dissolving the support during the purification of the carbon nanotubes.

The catalyst supports used in the present invention do not present the drawbacks of the catalyst supports of the state of the art.

The document of Dujardin E. et al., *Solid state communications* (2000), Elsevier USA, vol. 14, no. 10, pp. 543-546, is related to the synthesis of single shell carbon nanotubes using catalysts such as Co, Ni and mentions the presence of remaining interstitial metallic residues in purified single shell carbon nanotubes, even after prolonged treatments in boiling concentrated $HNO_3$.

The document of Cassell A. M. et al., *J. Phys. Chemistry B.* (1999), vol. 103, no. 31, pp. 6484-6492, discloses large scale CVD synthesis of single-walled carbon nanotubes using different catalysts with different metal compounds and/or different support materials. The optimised catalysts consist in Fe/Mo bimetallic species supported on a silica-alumina multicomponent material.

The document of Biro L. P. et al., *Materials Science and Engineering* (2002), vol. C19, pp. 9-13, Elsevier USA, is related to multiwall carbon nanotubes grown by the catalytic decomposition of acetylene over supported Co catalyst and subjected to wet and dry oxidation in order to remove unwanted products and catalytic traces. $KMnO_4/H_2SO_4$ aqueous oxidation procedure was found to be effective in reducing the Co content while damaging only moderately the outer wall of the nanotubes.

Documents XP-002197395 (Database WPI, Derwent Publications Ltd, London, GB) & RU 2 135 409 C of 27 Aug. 1999, are related to layered carbon nanotubes, hollow and/or metal-filled, obtained from a mixture of carbon-chain polymer and high molecular carbocyclic or heterocyclic compound with iron-, cobalt-, or nickel-containing substance such as hydroxide, oxide, salt, organometallic compound, or carbonyl, heated to 600-1000° C. under inert gas (nitrogen, helium, argon, xenon, krypton) atmosphere in the form of gas stream or static medium, wherein the geometric parameters and the number of metal inclusions are controlled.

The document of Che G. et al., *Chem. Mater.* (1998), vol. 10, pp. 260-267, discloses a method for preparing graphitic carbon nanofiber and nanotube ensembles. This method entails chemical vapor deposition based synthesis of carbon within the pores of an alumina template membrane with or without a Ni catalyst. Ethylene or pyrene was used in the chemical vapor deposition with reactor temperatures of 545° C. for Ni-catalysed method and 900° C. for uncatalysed method. The resultant carbon nanostructures were found to be uniform hollow tubes with open ends.

The document of Fonseca A. et al., *Appl. Phys.* (1998), vol. 67, pp. 11-22, discloses catalytic synthesis of single- and multi-wall carbon nanotubes using supported transition-metal catalysts. Said catalysts were prepared by different methods and tested in the production of nanotubes by decomposition of hydrocarbon at 700° C., using a fixed-bed flow reactor.

The document of Sinha A. K. et al., *Chem. Phys. Lett.* (2000), vol. 332, pp. 455-460, discloses the large-scale production of carbon nanotubes filled with metal by a catalytic chemical vapor deposition method using a microporous aluminophosphate support and presents said support as an alternative to Na—Y zeolite support.

Document WO 00/17102 is related to a process for producing single-wall carbon nanotubes using a catalyst-support system which, under certain experimental conditions, promotes the growth of single-wall carbon nanotubes in a specific size-range rather than the growth of large irregular-sized multi-walled carbon fibrils.

Document EP-A-0 619 388 discloses a non-aqueous metal catalyst comprising iron and at least one element chosen from Groups V, VI or VII or the lanthanides, for preparing carbon fibrils, particularly carbon fibrils having a morphology consisting of vermicular tubes that are free of a continuous thermal carbon overcoat and have graphite layers that are substantially parallel to the fibril axis.

Documents XP-002197396 (Database WPI, Section CH, Week 198237, Derwent Publications Ltd., London, GB) and JP-A-57127449 concern a method for producing a colloidal metal compound supported catalyst, said method comprising contacting a colloidal, metal compound with a powder consisting of alkaline earth metal salt in the absence of a protective colloid, and thereby supporting the colloidal metal compound on the powder.

U.S. Pat. No. 5,982,102 discloses a catalyst for the production of carboxylic acid esters for use in reacting an aldehyde with an alcohol in a liquid phase in the presence of molecular oxygen, said catalyst comprising calcium carbonate and palladium, bismuth and at least one element selected from the group consisting of barium, iron, zinc and germanium, these elements being supported on said calcium carbonate.

PRELIMINARY DEFINITIONS

The term "metal" stands for a single metal (i.e., Co, Fe, Ni, Cu, V, Mo, . . . ) or a mixture of two or more metals.

The "catalyst" comprises generally metal, metal oxides or other metal derivatives or mixtures thereof.

It is meant by "supported catalyst" a material which is produced by mixing the catalyst with the support. During the initial heating, water and other volatile compounds are eliminated from the supported catalyst while the active catalyst is being formed.

The wordings "active catalyst" refers to any metal, metal oxide or other metal-derivatives formed during the initial heating of the supported catalyst by the reaction between the support, the catalyst and the gases. The active catalyst is responsible for the carbon nanotube production by CCVD The aluminium alkoxide or any other aluminium salt is also called hereafter "aluminium hydroxide precursor".

"CCVD" is the English abbreviation for Catalytic Carbon Vapour Deposition and refers to a catalytic decomposition of hydrocarbons.

The "hydrocarbon" can be acetylene, ethylene, butane, propane, ethane, methane or any other gaseous or volatile carbon containing compound.

The expression "Crude nanotubes" refers to a mixture of carbon nanotubes and spent supported catalyst.

The "carbon material" is made of SWNTs, MWNTs, carbon fibers, carbon nanoparticles, amorphous carbon, pyrolytic carbon and soot in variable weight ratios.

AIMS OF THE INVENTION

The present invention aims to provide hydroxides and carbonates as efficient catalyst supports for catalysts to produce carbon nanotubes by CCVD.

Furthermore, the present invention presents a method to eliminate the spent supported catalyst from the carbon nanotubes produced without introducing amorphous carbon while dissolving the catalyst support.

An additional aim of the present invention is to provide a method for producing Al, Mg, Ca, Ce, La and Ti containing carbon nanotubes and to disclose an easy and rapid method for purification of the carbon nanotubes produced on supported catalysts based on the above mentioned supports.

SUMMARY OF THE INVENTION

The present invention is related to single and/or multiple-wall carbon nanotubes which may contain interstitial metals obtainable by a preparation process, comprising at a least catalytic step using a catalytic system, said catalytic system comprising a catalyst and a support, said support comprising hydroxides and/or carbonates or mixtures thereof with or without metal oxides.

Preferably, the interstitial metals present in the multi-wall nanotubes are selected from the group consisting of Al, Mg, Ca, Ce, La, and Ti.

A further key aspect of the present invention are carbon fibres obtainable by a preparation process, comprising at least a catalytic step using a catalytic system, said catalytic system comprising a catalyst and a support, said support comprising hydroxides and/or carbonates or mixtures thereof with or without metal oxides.

Another key aspect of the present invention is related to carbon nanotubes and/or carbon fibres characterised in that the support of the catalytic system comprises carbonates selected from the group of $CaCO_3$, $MgCO_3$, $Al_2(CO_3)_3$, $Ce_2(CO_3)_3$, $Ti(CO_3)_2$, $La_2(CO_3)_3$ and/or mixtures thereof as well as hydroxides selected from the group of $Ca(OH)_2$, $Mg(OH)_2$, $Al(OH)_3$, $Ce(OH)_4$, $Ti(OH)_4$, $La(OH)_3$ and/or mixtures thereof and oxides selected from the group consisting of $Al_2O_3$, $CaO$, $MgO$, $CeO_2$, $TiO_2$, $SiO_2$ and/or mixtures thereof.

A part of the present invention is a catalytic system for the preparation of single and/or multiple-wall carbon nanotubes and/or for the preparation of carbon fibres, said catalytic system comprising a dispersion of nanoparticles containing metals at any oxidation state in hydroxides and/or carbonates or mixtures thereof and said metals being selected from the group consisting of Fe, Co, Ni, V, Cu, Mo, Sn and/or mixtures thereof.

In a first embodiment of the present invention, a process is disclosed for the preparation of single and/or multiple-wall carbon nanotubes and carbon fibers comprising at least a catalytic step using a catalytic system, said catalytic system comprising a catalyst and a support, said catalyst being selected from the group consisting of metals and/or metal oxides and/or metal derivatives characterised in that said support is selected from the group consisting of hydroxides and/or carbonates or mixtures thereof with or without metal oxides.

In a preferred embodiment of the present invention, said carbonates are selected from the group consisting of $CaCO_3$, $MgCO_3$, $Al_2(CO_3)_3$, $Ce_2(CO_3)_3$, $Ti(CO_3)_2$, $La_2(CO_3)_3$ and/or mixtures thereof and the hydroxides are selected from the group consisting of $Ca(OH)_2$, $Mg(OH)_2$, $Al(OH)_3$, $Ce(OH)_4$, $Ti(OH)_4$, $La(OH)_3$ and/or mixtures thereof, said oxides being selected from the group consisting of $Al_2O_3$, $CaO$, $MgO$, $CeO_2$, $TiO_2$, $SiO_2$ and/or mixtures thereof.

In a second embodiment of the present invention, the preparation process is characterised in that the catalytic step is performed between 500 and 900° C. in order to prepare multi-wall nanotubes and between 900 and 1100° C. in order to prepare single-wall nanotubes.

SHORT DESCRIPTION OF THE DRAWINGS

FIG. 1 represents the weight loss of the supported catalyst SCA2 (see Table 1) as a function of the heating time under $N_2$ flow at 700, at 800, at 900 and at 1000° C. 250 mg of SCA2 were used in each experiment under a nitrogen flow of 300 ml/min. The dotted lines a-g represent the theoretical successive weight losses.

FIG. 2 represents results from acetylene decomposition at 700° C. on SCA2, both in continuous and in discontinuous processes.

FIG. 3b represents a higher magnification TEM image of MWNTs synthesised as in FIG. 3a.

FIG. 4a represents the inner and outer diameter distribution histograms of the MWNTs synthesised as in FIG. 3a.

FIG. 4b represents the number of walls as a function of the inner diameter distribution of the MWNTs synthesised as in FIG. 3a.

Figure 3A:
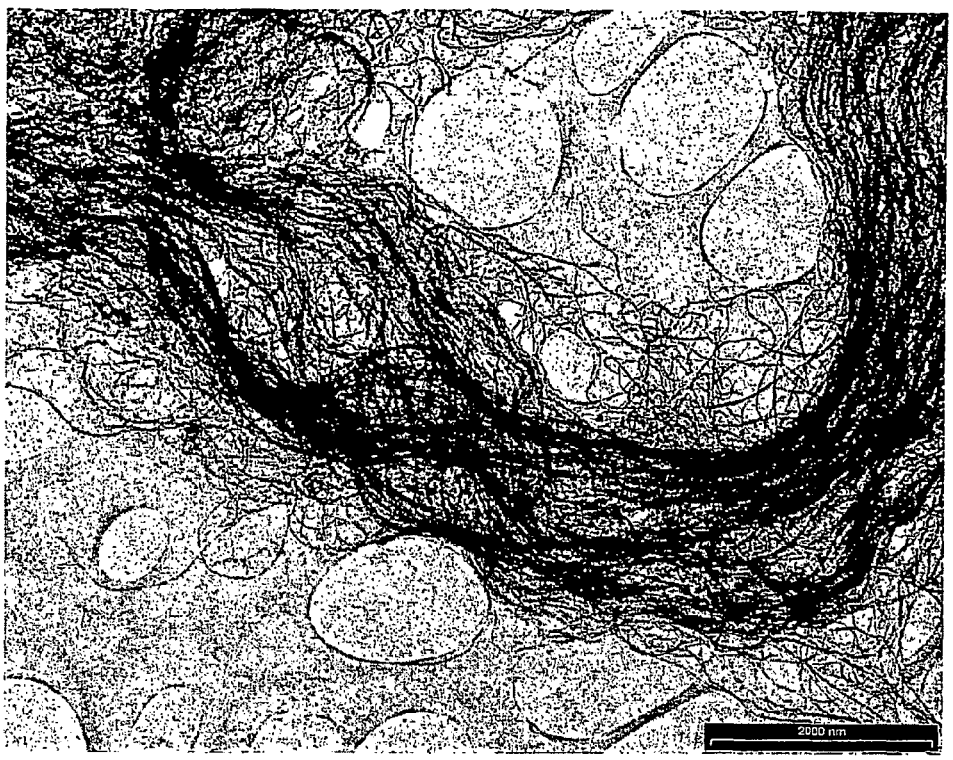
FIG. 3a represents a low magnification Transmission Electron Microscopy (TEM) image of as made MWNTs, synthesised by acetylene decomposition at 700° C. in a continuous reaction of 60 min, on the supported catalyst SCA2. The catalyst was activated by preheating 10 min in $N_2$ flow.

FIG. 5 contains results from ethylene decomposition on SCA2 (activated by preheating 10 min in $N_2$ flow) in a discontinuous process at 700, at 800 and at 900° C. A result of ethylene decomposition at 700° C. in a continuous process is also represented.

FIG. 6 contains results from ethane decomposition on SCA2 (activated by preheating 10 min in $N_2$ flow) in a continuous process at 700, at 800 and at 900° C. Results of ethane decomposition at 800° C. in a discontinuous process are also represented.

FIG. 7 contains results from methane decomposition on SCA2 (activated by preheating 10 min in $N_2$ flow) in a discontinuous process at 900 and at 1000° C.

FIG. 8 contains results of methane decomposition for 6 min on SCA2 (activated by 4 min of in situ preheating from 25 to 900-1000° C. in a $CH_4/H_2$ flow) in the presence of hydrogen at 900-1100° C.

DETAILED DESCRIPTION OF THE INVENTION

The aluminium hydroxide ($Al(OH)_3$) used in the present invention to prepare the catalyst support is preferably a commercial powder (Acros Organics) of variable particle size. The particle size can be very small (ca. 1 nm) or very large (ca. 1 mm). In the case of large particles the size distribution is always broader. It can also be a material prepared by the hydrolysis of an aluminium alkoxide or any other aluminium salt using water or a base, respectively as hydrolysing agents. The aluminium alkoxide or any other aluminium salt is called hereafter aluminium hydroxide precursor.

The hydroxides (i.e., $Ca(OH)_2$, $Mg(OH)_2$, $Ce(OH)_4$, $Ti(OH)_4$, $La(OH)_3$, ...) are preferably commercial powders of variable particle sizes (1 nm-1 mm).

The carbonates (i.e., $CaCO_3$, $MgCO_3$, $Al_2(CO_3)_3$, $Ce_2(CO_3)_3$, $Ti(CO_3)_2$, $La_2(CO_3)_3$, ...) are preferably commercial powders of variable particle sizes (1 nm-1 mm).

The method of preparation of supported catalysts comprises the following steps:

Mixing the hydroxide(s) and/or carbonate(s) with the catalyst (in the appropriate proportions). The mixing is carried out in a mortar or in a ball milling apparatus for a sufficient time so that a fine powder is obtained. The catalyst and support (hydroxides and/or carbonates) are dry or contain solvents like, ethanol, methanol, water ... or a mixture of solvents.

In another process, for example the aluminium hydroxide precursor is mixed with the catalyst (in the appropriate proportions) prior to its hydrolysis. The aluminium hydroxide precursor is preferably either dry or contains a solvent.

Drying the support-catalyst-solvent mixture by different means as air flow on a filter, rotary evaporator, vacuum pump or by the use of an oven or a furnace (heated at temperatures varying from 30° C. to 1200° C.).

Optionally finally grinding the support-catalyst mixture in a mortar or in a ball milling apparatus for a sufficient time to obtain a fine powder of said supported catalyst.

The carbon nanotubes production on the supported catalyst by CCVD comprises the following steps:

Spreading manually or mechanically an appropriate amount of supported catalyst on a quartz boat to be used as bed for the supported catalyst in the fixed bed reactor. In the case of a moving bed reactor, the supported catalyst is spread continuously or by intermittence mechanically or manually on the moving bed of the reactor.

The reactor, containing the supported catalyst, is either kept initially at the appropriate constant reaction temperature (400-1200° C.), or it is heated to the reaction temperature for an appropriate time of the reaction. Inert or reactant gas(es) can be passed over the supported catalyst during that step.

The pure or diluted hydrocarbon is passed over the supported catalyst at a predetermined temperature. Carbon nanotubes are grown on the supported catalyst as a result of the CCVD reaction. Diluted hydrocarbons are obtained by mixing at least one hydrocarbon with other gases such as nitrogen, argon, helium, hydrogen, CO, etc.

The crude nanotubes, composed of a mixture of carbon nanotubes and spent supported catalyst, is collected either continuously in the case of a moving bed reactor or stepwise in the case of a fixed bed reactor.

Preferably, the carbon nanotubes purification is carried out by dissolving the spent supported catalyst as follows:

Stirring the crude nanotubes in a concentrated basic solution, preferably a concentrated NaOH solution, at a temperature in between 100-250° C. Recovering the solid product by filtration and preferably washing it until a neutral pH is obtained. This first step is not necessary if the catalyst support contains only Mg and/or Ca derivatives.

Stirring the product in a concentrated acidic solution, preferably a concentrated HCl solution, at a temperature in between 0-120° C.

Recovering the solid product (purified carbon nanotubes) by filtration and preferably washing until a neutral pH is obtained.

Finally drying the purified carbon nanotubes by air flow on a filter or by a rotary evaporator or by the use of a vacuum pump or by the use of an oven or a furnace. Preferably, the oven or furnace is heated at temperatures varying from 30° C. to 400° C. in air or from 30° C. to 1200° C. under vacuum or inert atmosphere.

DESCRIPTION OF A PREFERRED EMBODIMENT OF THE PRESENT INVENTION

Part I: Applying Aluminium Hydroxide as Catalyst Support Production of Aluminium Hydroxide Based Supported Catalysts The production of aluminium hydroxide based supported catalysts involves the steps of obtaining the $Al(OH)_3$ support and the preparation of the supported catalyst.

i) Obtaining the $Al(OH)_3$ Support

The aluminium hydroxide ($Al(OH)_3$) is either a commercial powder of variable particle size (1 nm-1 mm) or a material prepared by the hydrolysis of an aluminium alkoxide or any other aluminium salt using water or a base, respectively, as hydrolysing agent. The aluminium alkoxide or other aluminium salt is represented hereafter as aluminium hydroxide precursor.

The aluminium hydroxide is prepared by the hydrolysis of the aluminium hydroxide precursor. Depending on the precursor, the following two examples are given:

1. The precursor is aluminium alkoxide: To 1 liter of water heated at 70-90° C., 104.74 g of aluminium isopropoxide powder (Aldrich) was added in small quantities with vigorous stirring. After complete addition of the powder, the aluminium hydroxide gel formed is maintained at 70-90° C. while stirring for one hour. The solid is separated by filtration, dried in an air oven at 120° C. for 24 hours and ground in a mortar to get the aluminium hydroxide as a fine powder.

2. The precursor is any other aluminium salt: To 1 liter of water taken in a beaker, a salt of aluminium ($Al(NO_3)_3$, $Al_2(SO_4)_3$, $AlCl_3$, etc., for instance) is added in portions and heated to 70-90° C. to reach complete dissolution. To the hot solution of aluminium salt, 28% ammonia (or the normality equivalent of NaOH) is added drop-wise with constant stirring till the precipitation is complete. The aluminium hydroxide gel thus obtained is digested, filtered and washed with distilled water till free from the anions of the used aluminium salt. $Al(OH)_3$ gel is spread on a glass plate and dried in a hot air oven overnight at 120° C. The solid obtained after drying is preferably ground into a fine powder in a mortar or a ball mill to get aluminium hydroxide support.

ii) Preparation of the Supported Catalyst

Because the catalyst particle size predetermines the diameter of the nanotubes that are obtained on said catalyst, efforts were put on the synthesis of well dispersed catalyst nanoparticles. Different "Methods" were used to prepare supported catalysts containing catalyst particles of different diameter distributions and in different chemical environments. Preferably, the supported catalysts are prepared by one of the methods, A-H described hereafter. These Methods can be classified into 4 categories:

Category 1

The supported catalyst is produced by mixing the aluminium hydroxide powder with the catalyst (in appropriate proportions). The mixing is carried out preferably in a mortar or in a ball milling apparatus for a sufficient time so that a fine powder is obtained. The aluminium hydroxide is preferably pure. The catalyst is either dry or contains as solvent water, ethanol, methanol, . . . or a mixture of solvents. This category includes preferably the catalyst preparation methods A, B and C.

Method A: Production of the Supported Catalyst Named SCA

A solution is prepared by the introduction of 2.8 g of $Co(AcO)_2.4H_2O$ and 4.7 g of $Fe(NO_3)_3.9H_2O$ in a baker, followed by the addition of 12 ml of $H_2O$. 40.0 g of $Al(OH)_3$ powder are introduced into a mortar. The salts solution is added to the $Al(OH)_3$ powder and mixed thoroughly for 10 minutes to obtain homogeneous powder. Finally, the solid is dried overnight in an oven at 120° C. in air, cooled down to room temperature and ground into a fine powder to obtain the supported catalyst.

The supported catalyst thus prepared is optionally calcined in a furnace heated at temperatures varying from 100° C. to 1200° C.

Method B: Production of the Supported Catalyst Named SCB

A solution is prepared by the introduction of 2.8 g of $Co(AcO)_2.4H_2O$ and 4.7 g of $Fe(NO_3)_3.9H_2O$ in a baker, followed by the addition of 12 ml of $H_2O$. 40.0 g of $Al(OH)_3$ powder are introduced into a mortar. The salts solution is added to the $Al(OH)_3$ and mixed thoroughly for 10 minutes to obtain homogeneous powder. The powder is dried for 2 hours in an oven at 120° C. in air, cooled to room temperature, the solid is again homogenised in a mortar and additional 6 ml of $H_2O$ are added to the powder. The powder is mixed thoroughly for 10 minutes, and dried overnight in an oven at 120° C. in air. Finally, the solid is cooled down to room temperature and ground into a fine powder to obtain the supported catalyst. Optional calcination is also applied to the supported catalyst, as in Method A.

Method C: Production of the Supported Catalyst Named SCC

A solution is prepared by the introduction of 2.8 g of $Co(AcO)_2.4H_2O$ and 4.7 g of $Fe(NO_3)_3.9H_2O$ in a baker, followed by the addition of 48 ml of ethanol and sonication for 10 minutes. 40.0 g of $Al(OH)_3$ are added and the mixture is stirred vigorously for 10 minutes to obtain an homogeneous wet cake. The wet cake is transferred to a sintered glass filter, dried by suction for 2 hours and further dried overnight in an oven at 120° C. in air. Finally, the solid is cooled down to room temperature and ground into a fine powder to obtain the supported catalyst. Optional calcination is also applied to the supported catalyst, as in Method A.

Category 2

The supported catalyst is produced by mixing the catalyst (in appropriate proportions), either with the hydrolysing agent (water) of the aluminium hydroxide precursor (aluminium alkoxide or other aluminium salt), or with the aluminium hydroxide precursor prior to its hydrolysis. The aluminium hydroxide precursor is preferably either pure or contains a solvent. The precursor of the catalyst is preferably either pure or contains a solvent. The solvent is preferably water, ethanol, methanol, . . . or a mixture of solvents. This category includes preferably the catalyst preparation Method D.

Method D: Production of the Supported Catalyst Named SCD

A solution is prepared by the introduction of 2.8 g of $Co(AcO)_2.4H_2O$ and 4.7 g of $Fe(NO_3)_3.9H_2O$ in a 2 liters round bottomed flask containing 1 liter of $H_2O$. The solution was heated at 70-90° C. and 104.74 g of aluminium isopropoxide powder was added in small quantities with vigorous stirring. After complete addition of the powder, the gel formed is digested at 70-90° C. while stirring for one hour. The excess of water is then removed by a rotary evaporator and the residue is dried in an air oven at 120° C. for 24 hours and ground in a mortar to get the supported catalyst as a fine powder. Optional calcination is also applied to the supported catalyst, as in Method A.

Category 3

The supported catalyst is produced by mixing the catalyst, with aluminium hydroxide powder (in the appropriate proportions), either in a mortar or in a ball mill. This category includes preferably the catalyst preparation Methods E and F.

Method E: Production of the Supported Catalyst Named SCE 2.8 g of $Co(AcO)_2.4H_2O$, 4.7 g of $Fe(NO_3)_3.9H_2O$ and 40.0 g of $Al(OH)_3$ are introduced in a mortar and mixed thoroughly to obtain an homogeneous powder that is dried overnight in an oven at 120° C. in air. Finally, the solid is cooled down to room temperature and ground into a fine powder to obtain the supported catalyst. Optional calcination is also applied to the supported catalyst, as in Method A.

Method F: Production of the Supported Catalyst Named SCF 2.8 g of $Co(AcO)_2.4H_2O$, 4.7 g of $Fe(NO_3)_3.9H_2O$ and 40.0 g of $Al(OH)_3$ are introduced in a ball mill and milled (i.e. for 2 hours) to obtain an homogeneous powder that is dried overnight in an oven at 120° C. in air. Finally, the solid is cooled down to room temperature and ground into a fine powder to obtain the supported catalyst. Optional calcination is also applied to the supported catalyst, as in Method A.

Category 4

The supported catalyst is prepared by mixing a microemulsion containing the catalyst, with aluminium hydroxide powder (in the appropriate proportions), followed by the elimination of the solvents. This category includes preferably the catalyst preparation methods G and H.

Method G: Production of the Supported Catalyst Named SCG 2.8 g of $Co(AcO)_2.4H_2O$ and 2.0 g of $Fe(AcO)_2$ are dissolved in 22.8 ml of water and the solution is added to 91.2 g of CTAB (cetyltrimethylamonium bromide) dissolved in 114 g of hexanol. The solution is strongly stirred (i.e. by sonication) until it becomes clear which means that it has reached the microemulsion stable state. The microemulsion is added to 40 g of $Al(OH)_3$ and the solvents are removed by rotary evaporator. Calcination at 500° C. in air is applied to the evaporation residue for 5 hours to obtain the supported catalyst.

Method H: Production of the Supported Catalyst Named SCH 2.8 g of $Co(AcO)_2.4H_2O$ and 2.0 g of $Fe(AcO)_2$ are dissolved in 22.8 ml of water and the solution is added to 91.2 g of CTAB dissolved in 114 g of hexanol. The solution is strongly stirred (i.e. by sonication) until it becomes clear which means that it has reached the microemulsion stable state. The catalyst is reduced by adding dropwise, to the microemulsions kept at 5° C. under vigorous stirring, threefold excess of reducing agent (i.e. $NaBH_4$ or $NaHB(Et)_3$) dissolved in 22.8 ml of water at 0° C. At the end of the reaction, temperature was raised to room temperature until complete hydrolysis of the excess hydride occurred. 40 g of $Al(OH)3$ are added to the microemulsion and the solvents are removed by rotary evaporator. Calcination at 500° C. in air is applied to the evaporation residue for 5 hours to obtain the supported catalyst.

Preferred Aluminium Hydroxide Based Supported Catalysts

The metal content of some of the preferred aluminium hydroxide based supported catalysts are represented in Table 1a. For sake of simplicity, the metal is considered as if it were introduced in the metallic form.

TABLE 1a

Metal content of the preferred aluminium hydroxide based supported catalysts.

| Cat. name | Cat. prep. method | Al(OH)₃ (wt %) | Co (wt %) | Fe (wt %) | Ni (wt %) | Cu (wt %) | V (wt %) | Mo (wt %) |
|---|---|---|---|---|---|---|---|---|
| SCA1 | A | 96.8 | 3.2 | — | — | — | — | — |
| SCA2 | A | 96.8 | 1.6 | 1.6 | — | — | — | — |
| SCA3 | A | 96.8 | — | 3.2 | — | — | — | — |
| SCA4 | A | 96.8 | — | — | 3.2 | — | — | — |
| SCA5 | A | 96.8 | 1.6 | — | 1.6 | — | — | — |
| SCA6 | A | 96.8 | — | 1.6 | 1.6 | — | — | — |
| SCA7 | A | 96.8 | — | — | 1.6 | 1.6 | — | — |
| SCA8 | A | 96.8 | — | — | — | 3.2 | — | — |
| SCA9 | A | 96.8 | 1.6 | — | — | 1.6 | — | — |
| SCA10 | A | 96.8 | — | 1.6 | — | 1.6 | — | — |
| SCA11 | A | 96.8 | — | — | — | — | 3.2 | — |
| SCA12 | A | 96.8 | 1.6 | — | — | — | 1.6 | — |
| SCA13 | A | 96.8 | — | — | — | — | — | 3.2 |
| SCA14 | A | 96.8 | 1.6 | — | — | — | — | 1.6 |
| SCB2 | B | 96.8 | 1.6 | 1.6 | — | — | — | — |
| SCC2 | C | 96.8 | 1.6 | 1.6 | — | — | — | — |
| SCD2 | D | 96.8 | 1.6 | 1.6 | — | — | — | — |
| SCE2 | E | 96.8 | 1.6 | 1.6 | — | — | — | — |
| SCF2 | F | 96.8 | 1.6 | 1.6 | — | — | — | — |
| SCG2 | G | 96.8 | 1.6 | 1.6 | — | — | — | — |
| SCH2 | H | 96.8 | 1.6 | 1.6 | — | — | — | — |

The supported catalysts of Table 1a are tested hereafter for carbon nanotubes production by CCVD in different experimental conditions.

Evidences of the Specific Effect of Aluminium Hydroxide as Catalyst Support for Carbon Nanotubes Production To produce carbon nanotubes on the supported catalysts, the supported catalysts have to be heated at temperatures ranging from 400 to 1200° C. The initial heating is preferably carried out in the presence of inert gases (i.e., $N_2$, Ar, . . . ) but, reactant gases (i.e., $O_2$, $H_2$, hydrocarbons, . . . ) can also be present. During the initial heating, water and other volatile compounds are eliminated from the supported catalyst while the active catalyst is being formed. Here active catalyst refers to metal particles, metal oxides or other metal derivatives formed during the initial heating of the supported catalyst by the reaction between the support, the catalyst and the gases. The active catalyst is responsible for the carbon nanotubes production by CCVD.

Part A: Main Experiments using the Supported Catalyst SCA2

1. Formation of the Active Catalyst using $N_2$ as Inert Gas

The initial heating of the typical SCA2 supported catalyst will cause the elimination of water, acetic acid, $No_2$ and $O_2$ thus causing a weight loss of the supported catalyst. The weight loss can be summarised as follows (starting from 47.5 g of supported catalyst SCA2):

| | |
|---|---|
| 2.8 g of Co(OAc)$_2$•4H$_2$O | |
| → 1.99 g of Co(OAc)$_2$ + 0.81 g of H$_2$O | (a: - 1.70%) |
| → 0.84 g of CoO + 1.15 g of AcOAc | (b: - 2.42%) |
| 4.7 g of Fe(NO$_3$)$_3$•9H$_2$O | |
| → 2.81 g of Fe(NO$_3$)$_3$ + 1.88 g of H$_2$O | (c: - 3.96%) |
| → 0.93 g of Fe$_2$O$_3$ + 1.89 g of [6 NO$_2$ + 3/2 O$_2$] | (d: - 3.97%) |
| 40.0 g of Al(OH)$_3$ | |
| → 35.4 g of Al$_2$O(OH)$_4$ + 4.6 g of H$_2$O | (e: - 9.68%) |
| → 30.8 g of Al$_2$O$_2$(OH)$_2$ + 4.6 g of H$_2$O | (f: - 9.68%) |
| → 26.2 g of Al$_2$O$_3$ + 4.6 g of H$_2$O | (g: - 9.68%) |
| Maximum weight loss: | (41.09%) |

The weight loss of the supported catalyst SCA2 was measured as a function of the heating time under $N_2$ flow at 700, 800, 900 and 1000° C. The results are represented in FIG. 1. As seen in FIG. 1, the weight loss of the supported catalyst SCA2 is faster at 800° C. than at 700° C. Nevertheless, at both of the temperatures, which are the convenient temperatures for MWNTs formation, the weight loss equilibrium is approximately reached after 10 minutes of heating under $N_2$ flow. Between 900 and 1000° C. that are the convenient temperatures for SWNTs formation, the weight loss is higher. However, the equilibrium of the weight loss is reached here also approximately after 10 minutes of heating under $N_2$ flow.

The determination of the initial time of heating under inert gases (i.e., $N_2$) is very important in the formation of the active catalyst. It is evident from the points which follow, that the supported catalysts prepared in the previous section have to be activated by an initial time of heating in appropriate atmosphere prior to carbon nanotubes production. The latter production is directed either to SWNTs or to MWNTs as follows:

The production of MWNTs was preferably carried out using 1 g of supported catalyst at 500-900° C. during 1 hour using acetylene, ethylene or ethane flow of 30 ml/min and 300 ml/min of $N_2$ as carrier gas.

The production of SWNTs was preferably carried out using 4 g of supported catalyst at 900-1100° C. during 6 min. using methane flow of 250 ml/min and 1000 ml/min of $H_2$ or $N_2$ as carrier gas.

2. Formation of the Active Catalyst and its Deactivation using $C_2H_2/N_2$ as Reactant Gas Mixture Active catalysts were formed starting from the supported catalyst SCA2 using preheating times in a flow of $N_2$ of 0, 10 or 60 min and, their carbon nanotubes formation activity was measured in situ. The results, in terms of carbon deposit as a function of reaction time, are represented in FIG. 2. The term carbon deposit stands for:

Carbon deposit (%)=100($m_{crude}$−$m_{cat.\ dry}$)/$m_{cat.\ dry}$

Where: $m_{crude}$ is the mass of the as made carbon material and spent supported catalyst; $m_{cat.\ dry}$ is the mass of the spent supported catalyst. The carbon material is made of SWNTs, MWNTs, carbon fibers, carbon nanopaticles, amorphous carbon, pyrolytic carbon and soot in variable weight ratios. The higher the SWNTs and MWNTs content, the better the quality of the carbon material.

FIG. 2 contains results from acetylene decomposition at 700° C. on SCA2, both in continuous and discontinuous processes. In this figure, the following tendencies are observed:

The carbon deposit is more important for a preheating time of 10 min in a flow of $N_2$ at 700° C. Further preheating, up to 60 min, deactivates the catalyst progressively. Nevertheless, the lowest carbon deposit was observed in the case of no preheating in a flow of $N_2$ at 700° C. It means that much less active sites are formed in this case.

An increase of the acetylene flow from 30 ml/min (normal flow) to 60 ml/min (high flow), keeping the nitrogen flow at 300 ml/min causes an increase of the carbon deposit (discontinuous processes in FIG. 2).

The carbon deposit is more important for a continuous process compared to a discontinuous one.

The initiation step (slope at the origin of the curves in FIG. 2) is very rapid and cannot be distinguished from the propagation step. In that step, the carbon "dissolved" in the active catalyst by the decomposition of the first hydrocarbon molecules diffuses out of the active catalyst and condenses to form the frontal tip of the nanotube.

The propagation step (first slope of the curves in FIG. 2) lasts for approximately 15 or 60 min depending on, if 10 or 60 min of preheating in a flow of $N_2$ at 700° C. is applied, respectively. In this step, the carbon "dissolved" in the active catalyst by the decomposition of the further hydrocarbon molecules diffuses out of the active catalyst and condenses to form the body of the nanotube. It should be noted here that the carbon can also condense forming the rear tip of the nanotube, terminating the tube, and a new nanotube frontal tip.

The deactivation step (inflection of the curves in FIG. 2) takes place at a much lower carbon deposit and reaction time when the preheating time is more than 10 min. In this step, the carbon "dissolved" in the active catalyst by the decomposition of the last hydrocarbon molecules diffuses out of the active catalyst and condenses to form either the nanotube rear tip and encapsulate the active catalyst or to encapsulate the active catalyst in the nanotube rear tip. The processes of stopping the reaction and cooling the crude product to room temperature for weighting, followed by the next reaction on the same sample (discontinuous reaction in FIG. 2), enhances the deactivation of the catalyst.

The amorphous carbon production step (second slope of the curves in FIG. 2) takes place at a much lower carbon deposit and reaction time when the preheating time is more than 10 min. In this step, the hydrocarbon molecules are decomposed on the "graphite-like" outer surface of the carbon nanotubes, to form amorphous carbon that condenses on the outer surface of the nanotubes. The second slope of the curve can be approximated to the rate of formation of amorphous carbon. The increase in the acetylene flow from 30 ml/min (normal flow) to 60 ml/min (high flow), keeping the nitrogen flow at 300 ml/min causes an increase in the amorphous carbon formation rate in the discontinuous processes of FIG. 2.

Characteristics of the Nanotubes:

Direct Observation by TEM

The nanotubes were analysed by transmission electron microscopy with a Tecnai 10 (Philips) microscope. To prepare TEM grids, 1 mg of sample was dispersed into 20 ml of ethanol, followed by 2 minutes sonication. Then a drop was deposited on a Cu/Rh grid covered with either a vinyl polymer called formvar or holey-carbon, and the grid was dried overnight under vacuum.

Figure 3B:
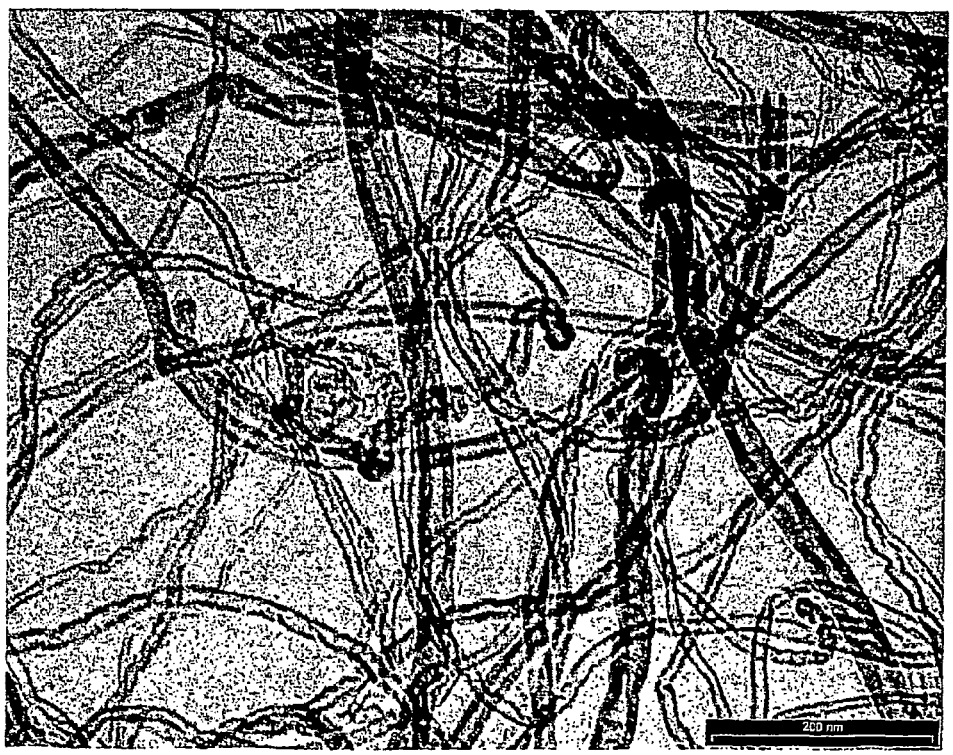
Figure 3C:
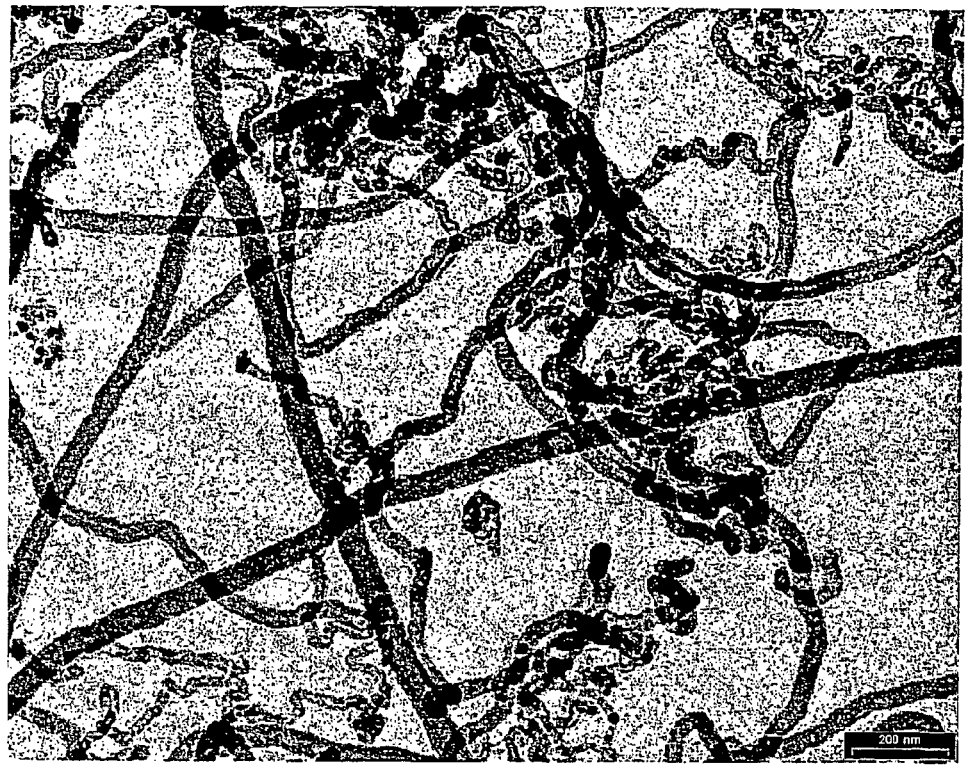
FIG. 3c represents a low magnification TEM image of as made carbon fibers, synthesised by acetylene decomposition at 700° C. in a continuous reaction of 60 min, on the supported catalyst SCA63 (see Table 6a). The catalyst was activated by preheating 10 min in $N_2$ flow.
Figure 3D:
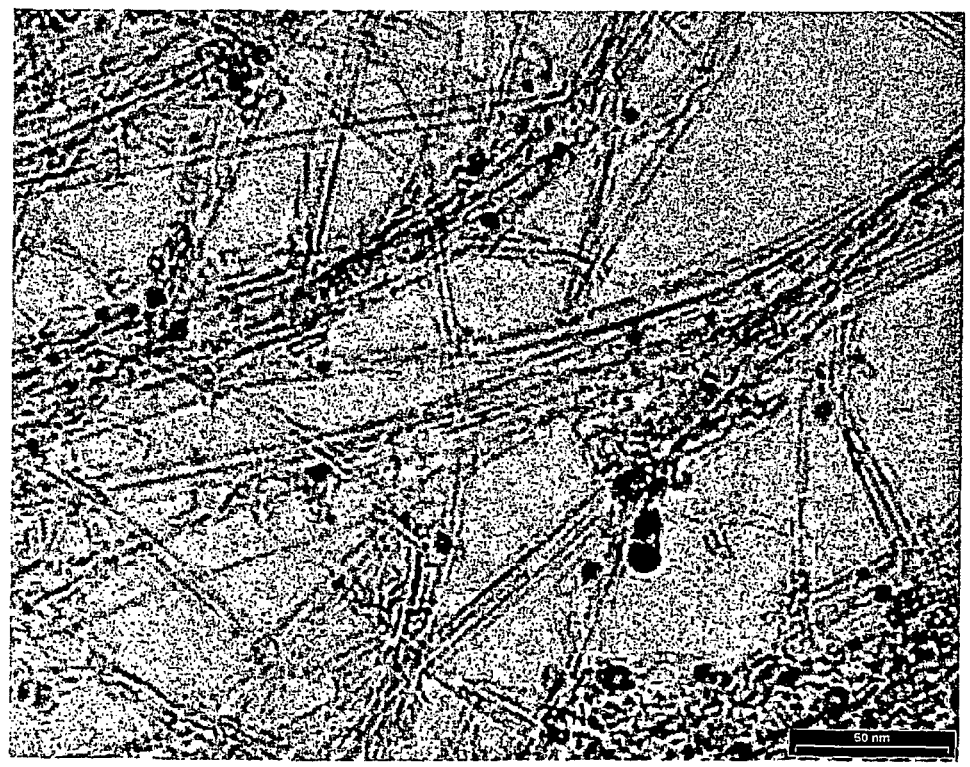
FIG. 3d represents a low magnification TEM image of purified SWNTs, in bundles, synthesised by $CH_4/H_2$ decomposition at 1000° C. for 6 min, on the supported catalyst SCC81 (see Table 8b). The catalyst was activated by 4 min of in situ preheating from 25 to 1000° C. in a $CH_4/H_2$ flow.

The TEM observation of the samples revealed that the carbon material produced in the continuous process for 60-90 min (FIG. 2) were MWNTS containing only a slight amount of amorphous carbon on the outer surface (FIGS. 3a and 3b). The MWNTs produced in a discontinuous process for 30 min were of same quality but represented lower carbon deposit. The MWNTs produced in continuous process for 300 min contained a little amorphous carbon, whereas the tubes from discontinuous process contained a lot of amorphous carbon. Those tubes produced in a discontinuous process under high acetylene flow (high flow curve in FIG. 2) contained even more amorphous carbon.

Distribution of the Carbon Nanotubes

Figure 4A:
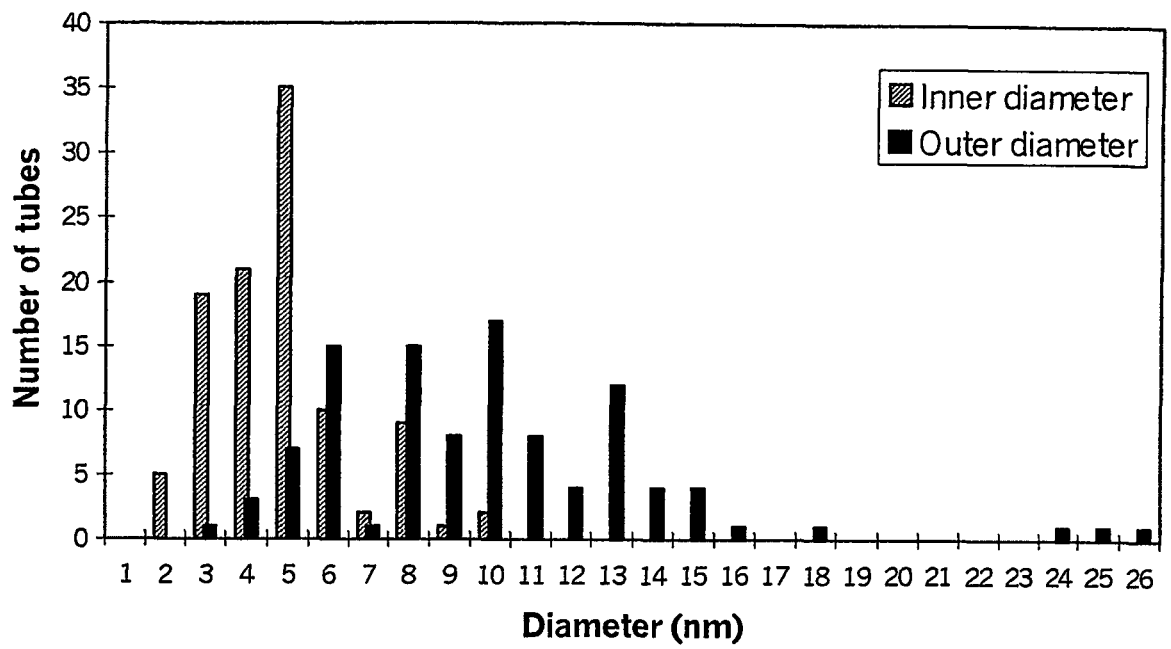

The distribution histograms of the inner and outer diameters of MWNTs, synthesised by acetylene decomposition at 700° C. in a continuous reaction of 60 min, on the supported catalyst SCA2 activated by preheating in $N_2$ flow for 10 min, are represented in FIG. 4a. The average inner and outer diameter of the MWNTs was found to be 4.7 and 9.7 nm, respectively. No amorphous carbon is noticed either in the sample or on the walls of the tubes. The tubes are generally turbostratic with some defects in the outer surface. In the samples, MWNTs of three categories of outer diameters, i.e. thick, thin and very thin, were observed:

MWNTs with an average inner/outer diameter of 6/25 nm and a length up to 50 μm, will be called <<thick MWNTs>> hereafter.

MWNTs with an average inner/outer diameter of 4/15 nm and a length up to 50 μm, will be called <<thin MWNTs>> hereafter. They are generally produced in long and thick bundles.

MWNTs with an average inner/outer diameter of 5/10 nm and a length up to 50 μm, will be called <<very thin MWNTs>> hereafter.

Figure 4B:
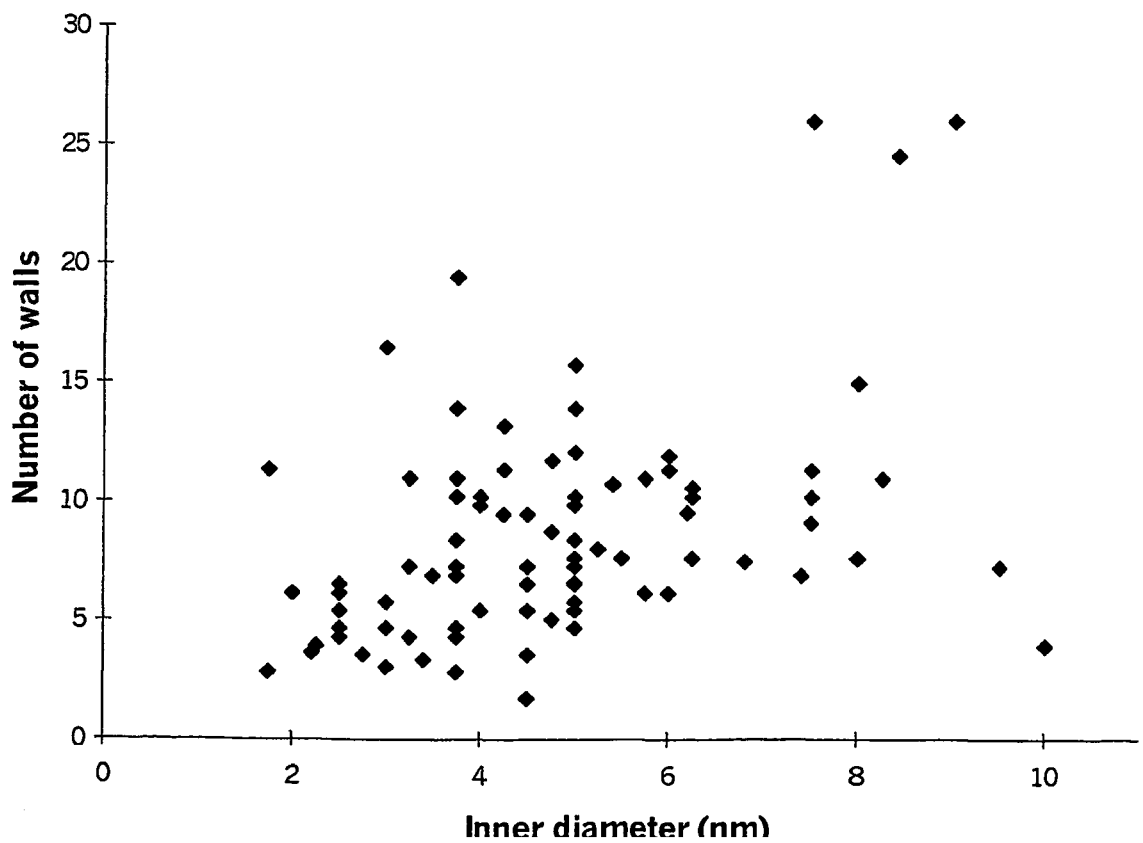

In FIG. 4b, the distribution of number of walls in the as synthesized MWNTs as a function of the inner diameter is represented. These MWNTs are obtained by acetylene decomposition at 700° C. in a continuous reaction for 60 min on the supported catalyst SCA2. The supported catalyst was activated by preheating it for 10 min in a flow of $N_2$. The number of walls of the MWNTs is in the range of 2-26 and the average value is 8.

PIXE and PIGE Analysis of the Carbon Nanotubes

The removal of the support and the catalyst during the purification process was followed by analysing the samples at various stages of purification by powder X ray diffraction, PIGE (Proton Induced Gamma ray Emission) and PIXE (Proton Induced X-ray Emission) techniques. PIGE analysis showed that the purified MWNTs (synthesised on SCA2 as described in the caption of FIG. 3a) contained 0.1 wt % of Al. PIXE analysis of the same sample revealed the presence of 0.3 wt % of Fe and 0.2 wt % of Co.

Complementary Reactions

Effect of the Weight of Supported Catalyst

The effect of the weight of supported catalyst on the nature of the nanotubes was studied both with (i) and without (ii) varying the velocity of the reactant gas mixture. In all the cases a spongy deposit of the carbon on the spent catalyst was obtained.

(i) When the weight of supported catalyst is varied and the velocity of the reactant gas mixture is changed proportionally in order to keep the ratio constant (constant contact time conditions), the carbon deposit was found to be constant (580%) within 2% of error (Table 1b). It means that the gases are perfectly mixed in the reactor.

TABLE 1b

Effect of the change in the gas flow on the carbon deposit, keeping the contact time as a constant. Preheating time of 10 min in a flow of $N_2$ at 700° C., followed by 60 min of reaction.

| SCA2(g) | Spreading (cm) | $C_2H_2$ flow (ml/min) | $N_2$ flow (ml/min) | C deposit[a] (%) |
|---|---|---|---|---|
| 0.062 | 5 | 7.5 | 75 | 586 |
| 0.125 | 10 | 15.0 | 150 | 570 |
| 0.187 | 15 | 22.5 | 225 | 573 |
| 0.250 | 20 | 30.0 | 300 | 589 |

[a]Average carbon deposit: 580%

(ii) When the weight of supported catalyst is varied without changing the velocity of the reactant gas mixture, in a 60 min reaction, the carbon deposit decreased from 589 to 325 and then to 252% when the initial supported catalyst weight is increased from 0.25 to 0.50 and then to 1.0 g, respectively. When the weight of the supported catalyst was either 0.25 or 0.50 g, the carbon material on the catalyst was homogeneous whereas in the case when 1 g of the supported catalyst was used there was more carbon material at the entry of the gases than at the other end of the supported catalyst plate.

Effect of the Acetylene Flow Rate

The effect of increasing the acetylene flow from 30 to 60 ml/min was similar to that observed in the discontinuous process represented in FIG. 2. The same effect was also studied in a 60 min reaction of continuous process using 1.0 g of supported catalyst. It was observed that the carbon deposit increases from 252 to 349% with increasing the acetylene flow rate from 30 to 50 ml/min. Here again though the carbon material remained spongy and it was not even on the catalyst. There was more carbon material at the end where the gases enter the reactor than at the other end.

Effect of the Rate of Flow of Acetylene Gas

The effect of increasing the acetylene flow from 30 to 60 ml/min was similar to that observed in the discontinuous process represented in FIG. 2. The same effect was also studied in a 60 min reaction of continuous process using 1.0 g of supported catalyst. It was observed that the carbon deposit increases from 252 to 349% with increasing the acetylene flow rate from 30 to 50 ml/min. Here again though the carbon material remained spongy and it was not even on the catalyst. There was more carbon material at the end where the gases enter the reactor than at the other end.

Effect of the Rate of Glow of Nitrogen Gas

The effect of rate of flow of nitrogen at 300, 400 and 500 ml/min was investigated, in a 60 min continuous process using 0.5 g of supported catalyst. The intention was to improve the uniformity of the carbon material on the spent catalyst. The only observation that could be made was that the higher the flow rate of $N_2$ gas, the lower the height of the carbon material on the spent catalyst and the deposit was more regular.

3. Formation of the Active Catalyst and its Deactivation using $C_2H_4/N_2$ as Reactant Gas Mixture FIG. 5 contains the results from ethylene decomposition on SCA2 (activated by preheating for 10 min in $N_2$ flow) in a discontinuous process carried out at 700, 800 and 900° C. The results of ethylene decomposition at 700° C. in a continuous process are also represented. From this figure, the following tendencies are observed:

At 700° C., the carbon deposit in a 60 min continuous process is twice as high when compared with a discontinuous one. Hence, the discontinuous reaction process deactivates the catalyst.

Comparing the curves for carbon deposit obtained in a discontinuous process at 700-900° C., it can be concluded that the optimum reaction temperature is 700° C. In fact, at this temperature, after the deactivation step the second slope of the carbon deposit curve is horizontal, meaning that there is no amorphous carbon deposition on the carbon nanotubes. At 800 and 900° C., the second slopes of the carbon deposit curves, which is characteristic of the rate of amorphous carbon deposition are very small and large, respectively.

Characteristics of the Nanotubes from TEM Observations

Very abundant thin and very thin MWNTs, as well as some thick MWNTs, are observed on the samples produced at 700 or at 800° C. No amorphous carbon was observed on the walls of these MWNTs, either in a continuous process (60 min at 700° C.), or in a discontinuous one (180 min at 700 or at 800° C.).

The MWNTs produced in a discontinuous process at 900° C. are covered by a very thick layer of amorphous carbon.

4. Formation of the Active Catalyst and its Deactivation using $C_2H_6/N_2$ as Reactant Gas Mixture FIG. 6 contains the results from ethane decomposition on SCA2 (activated by preheating for 10 min in $N_2$ flow) in a continuous process at 700, 800 and 900° C. Results of ethane decomposition at 800° C. in a discontinuous process are also represented. On that figure, the following tendencies are observed:

At 800° C., the carbon deposit for a 60 min reaction is twice more important for a continuous process than for a discontinuous one. Hence, the discontinuous reaction process deactivates the catalyst.

Comparing the carbon deposit curves of a discontinuous process at 700-900° C., it can be concluded that the optimum reaction temperature is 800° C. In fact, at that temperature, after the deactivation step the second slope of the carbon deposit curve is quite horizontal, meaning that there is very small amount of amorphous carbon deposition on the carbon nanotubes.

Characteristics of the Nanotubes from TEM Observations

Very abundant thin and very thin MWNTs, as well as some thick MWNTs, are observed on the samples produced at 700 or at 800° C. No amorphous carbon was observed on the walls of these MWNTS, either in a continuous process (60 min at 700 or at 800° C.), or in a discontinuous one (150 min at 800° C.).

The MWNTs produced in a continuous process of 60 min at 900° C. are covered by a thin layer of amorphous carbon and islands of amorphous carbon are also observed.

5. Formation of the Active Catalyst and its Deactivation using $CH_4/N_2$ as Reactant Gas Mixture FIG. 7 contains results from methane decomposition on SCA2 (activated by preheating 10 min in $N_2$ flow) in a discontinuous process at 900 and at 1000° C. On that figure, it is observed that the carbon deposit is more important at 900° C. than at 1000° C.

Characteristics of the Nanotubes from TEM Observations

MWNTs and SWNTs contaminated with encapsulated metal nanoparticles, fibers and amorphous carbon were found in the samples synthesised both at 900 and at 1000° C. The SWNTs content was more important for the samples synthesised at 1000° C.

SWNTs synthesised by catalytic decomposition of methane were nanotubes with an average diameter of 2 nm and a length up to 10 μm. They were found both isolated and in small bundles.

6. Formation of the Active Catalyst and its Deactivation using $CH_4/H_2$ as Reactant Gas Mixture FIG. 8 contains results of methane decomposition for 6 min on SCA2 (activated by 4 min of in situ preheating from 25 to 900-1100° C. in a $CH_4/H_2$ flow of 75/300 ml.min$^{-1}$) in the presence of hydrogen at 900-1100° C. On that figure, it is observed that the carbon deposit increases with increasing the reaction temperature up to 980° C. Further increasing the temperature up to 1100° C. causes a decrease of the carbon deposit. The increase of the carbon deposit with increasing the temperature from 900 to 980° C. is characteristic of a better activity of the supported catalyst at higher temperatures. Oppositely, the decrease of carbon deposit with increasing reaction temperature from 980 to 1100° C. can be explained by the higher hydrogenation rate, thus eliminating the carbon deposit in a consecutive reaction, as a function of the temperature.

Characteristics of the Nanotubes from TEM Observations

SWNTs contaminated with MWNTs, encapsulated metal nanoparticles, fibers and amorphous carbon were found mainly on the samples synthesised at 950-1050° C. The SWNTs content was more important for the samples synthesised at 1000° C.

SWNTs synthesised by catalytic decomposition of methane in the presence of hydrogen were nanotubes with an average diameter of 2 nm and a length up to 10 μm. They were found both isolated and in small bundles.

Part B: Relative Activity of the Catalysts Supported on Aluminium Hydroxide

The activity of all of the aluminium hydroxide based supported catalysts described in Table 1a were measured in identical reaction conditions. The comparison of their activity to produce MWNTs from acetylene decomposition is reported in Table 1c.

Acetylene decomposition on a supported catalyst for 60 min at 700° C. using 1.0 g of supported catalyst (activated by 5 min of in situ preheating from 25 to 700° C. and a 5 min plateau at 700° C. in a 300 ml.min$^{-1}$ N$_2$ flow) and a C$_2$H$_2$/N$_2$ flow of 30/300 ml.min$^{-1}$ is called "MWNTs-700 conditions" hereafter.

TABLE 1c

Relative activity of the catalysts supported on aluminium hydroxide to produce nanotubes in MWNTs-700 conditions.

| Sup. cat. name | Metal$^a$ | Weight loss$^b$ (%) | Carbon deposit (%) | Quality of the carbon material from TEM$^c$ | | |
|---|---|---|---|---|---|---|
| | | | | MWNTs | Am. C | Fib. |
| SCA1 | Co | 38.0 | 147 | +++ | -- | --- |
| SCA2 | Co—Fe | 34.5 | 252 | +++ | -- | --- |
| SCA3 | Fe | 34.2 | 72 | ++ | + | - |
| SCA4 | Ni | 39.0 | 43 | ++ | + | - |
| SCA5 | Co—Ni | 39.0 | 50 | +++ | -- | --- |
| SCA6 | Fe—Ni | 36.6 | 231 | +++ | -- | - |
| SCA7 | Cu—Ni | 35.4 | 107 | + | ++ | ++ |
| SCA8 | Cu | 36.5 | 17 | + | ++ | +++ |
| SCA9 | Co—Cu | 36.0 | 108 | + | ++ | ++ |
| SCA10 | Fe—Cu | 34.4 | 53 | + | ++ | + |
| SCA11 | V | 28.7 | 12 | -- | ++ | -- |
| SCA12 | Co—V | 36.1 | 193 | +++ | -- | + |
| SCA13 | Mo | 26.8 | 16 | -- | ++ | -- |
| SCA14 | Co—Mo | 33.5 | 87 | +++ | -- | -- |
| SCB2 | Co—Fe | 34.5 | 257 | +++ | -- | --- |
| SCC2 | Co—Fe | 25.5 | 162 | +++ | -- | --- |
| SCD2 | Co—Fe | 22.1 | 33 | ++ | - | -- |
| SCE2 | Co—Fe | 35.0 | 232 | +++ | -- | -- |
| SCF2 | Co—Fe | 27.7 | 153 | +++ | - | -- |
| SCG2 | Co—Fe | 7.4 | 93 | +++ | --- | --- |
| SCH2 | Co—Fe | 4.3 | 138 | ++ | - | - |

$^a$The metal, introduced as salt but considered as if it were introduced in the metallic form, does represent 3.2 wt % if single and 1.6-1.6 wt % in mixtures.
$^b$Weight loss of the supported catalyst (1.0 g) after 5 min of preheating from 25 to 700° C. and a 5 min plateau at 700° C. in a 300 ml · min$^{-1}$ N$_2$ flow.
$^c$The quality of the carbon material was attributed as follows: +++ very high density; ++ high density; + medium density; - low density; -- very low density; --- not observed.

As seen in Table 1c, as far as individual metals are concerned, cobalt is the most active metal to produce MWNTs (147%) followed by iron (72%) and nickel (43%). Copper, molybdenum and vanadium are the least active ones (17%, 16% and 12% respectively). The activity of individual metals is in the order Co>>Fe>>Ni>>Cu=Mo>>V.

Concerning the activity to produce MWNTs of aluminium hydroxide based supported catalysts containing mixture of metals (Table 1c):

The "method" used to prepare the supported catalyst is of importance. The Co—Fe supported catalysts were found very active if prepared by methods A, B or E, active if prepared by methods C, F or H and less active if prepared by methods G or D. Moreover, helical carbon manotubes were found on the products of methods D and F.

Fe—Co is most active followed by Fe—Ni and Fe—Cu (252%, 231%, 53%).

Co—Fe is most active followed by Co—V, Co—Cu, Co—Mo and Co—Ni (252%, 193%, 108%, 87%, 50%).

Ni—Fe is most active followed by Ni—Co and Ni—Cu (231%, 107%, 50%).

Cu—Co and Cu—Ni are equally active followed by Cu—Fe (108%, 107%, 53%).

The activity of mixture of metals is in the order Fe—Co>Fe—Ni>Co—V>Co—Cu=Ni—Cu>Co—Mo>Fe—Cu=Co—Ni.

Two different metal-acetates and nitrates, were used to prepare the supported catalysts and find out if the anion of the salt has any influence on the supported catalyst activity in the production of carbon nanotubes. The supported catalysts prepared from acetate salts (Table 1d) were powdery after drying at 120° C. overnight and could be easily ground further to make it a fine powder. On the other hand the supported catalysts obtained from nitrate salts were hard, stuck to the beaker after drying at 120° C., and was difficult to take out from the beaker and grind into a fine powder in a mortar or a ball mill. The results, in terms of carbon deposit, are listed in Table 1d.

TABLE 1d

Relative activity of the Co—Fe/Al(OH)$_3$ supported catalyst to produce nanotubes in MWNTs-700 conditions, depending on the salts precursors.

| Sup. cat. name | Co salt | Fe salt | Weight loss$^b$ (%) | Carbon deposit (%) |
|---|---|---|---|---|
| SCA2 | Co(AcO)$_2$•4H$_2$O | Fe(NO$_3$)$_3$•9H$_2$O | 34.5 | 252 |
| SCA2a | Co(AcO)$_2$•4H$_2$O | Fe(AcO)$_2$ | 34.7 | 192 |
| SCA2b | Co(NO$_3$)$_2$•6H$_2$O | Fe(AcO)$_2$ | 30.0 | 188 |
| SCA2c | Co(NO$_3$)$_3$•6H$_2$O | Fe(NO$_3$)$_3$•9H$_2$O | 30.4 | 226 |

$^b$see Table 1c.

As seen in Table 1d, the effect of the anion is limited but, better results are obtained when iron nitrate is used (SCA2 and SCA2c).

Part II: Applying Hydroxides, Others than Al(OH)$_3$, as Catalyst Supports

The hydroxides, others than Al(OH)$_3$, based supported catalysts were prepared preferably using Method A. The activity of the other hydroxides based supported catalysts were measured in identical reaction conditions. The comparison of their activities to produce MWNTs from acetylene decomposition and, to produce SWNTs from methane decomposition is reported in Tables 2a and 2b, respectively. The term "other hydroxides" stands for hydroxides of metals other than Al (i.e., Ca(OH)$_2$, Mg(OH)$_2$, Ce(OH)$_4$, Ti(OH)$_4$, La(OH)$_3$, . . . ).

TABLE 2a

Relative activity of the catalysts supported on other hydroxides to produce nanotubes in MWNTs-700 conditions.

| Sup. | M[a] | Sup. cat. name | Weight loss[b] (%) | Carbon deposit (%) | Quality of the carbon material from TEM[c] | | |
|---|---|---|---|---|---|---|---|
| | | | | | MWNTs | Am. C | Fib. |
| $Ca(OH)_2$ | Co | SCA21 | 28.0 | 50 | +++ | -- | -- |
| $Ca(OH)_2$ | Co—Fe | SCA22 | 27.9 | 130 | +++ | -- | -- |
| $Mg(OH)_2$ | Co | SCA23 | 33.3 | 32 | +++ | -- | -- |
| $Mg(OH)_2$ | Co—Fe | SCA24 | 35.5 | 99 | +++ | -- | -- |
| $Ce(OH)_4$ | Co—Fe | SCA25 | 19.2 | 46 | +++ | – | + |
| $Ti(OH)_4$ | Co—Fe | SCA26 | 14.2 | 12 | ++ | ++ | ++ |
| $La(OH)_3$ | Co—Fe | SCE27 | 18.0 | 25 | + | ++ | -- |

[a-c]see Table 1c.

As seen in Table 2a, the activity to produce MWNTs of mixed metals (i.e. Co—Fe) catalysts supported in other hydroxides is again higher than that of a single metal (i.e. Co). The hydroxide of Al (Table 1c) is best support followed by those of Ca, Mg, Ce, Ti and La.

Methane decomposition on a supported catalyst for 6 min at 1000° C. using 1.0 g of supported catalyst (activated by 4 min of in situ preheating from 25 to 1000° C. in the $CH_4/H_2$ flow) and a $CH_4/H_2$ flow of 75/300 $ml.min^{-1}$ is called "SWNTs-1000 conditions" hereafter.

TABLE 2b

Relative activity of the catalysts supported on hydroxides to produce nanotubes in SWNTs-1000 conditions.

| Sup. | Metal[a] | Sup. cat. name | Weight loss[d] (%) | Carbon deposit (%) | Quality of the carbon material from TEM[c] | | | |
|---|---|---|---|---|---|---|---|---|
| | | | | | SWNTs | MWNTs | Am. C | Fib. |
| $Al(OH)_3$ | Co—Fe | SCA2 | 39.0 | 16.5 | – | + | + | -- |
| $Ca(OH)_2$ | Co | SCA21 | 30.6 | 10.2 | -- | + | ++ | – |
| $Ca(OH)_2$ | Co—Fe | SCA22 | 29.4 | 5.7 | -- | – | ++ | – |
| $Mg(OH)_2$ | Co | SCA23 | 34.7 | 3.9 | -- | -- | + | -- |
| $Mg(OH)_2$ | Co | SCC23 | 29.4 | 2.2 | ++ | -- | + | -- |
| $Mg(OH)_2$ | Co | SCE23 | 33.9 | 8.8 | -- | --- | + | -- |
| $Mg(OH)_2$ | Co—Fe | SCA24 | 37.2 | 12.8 | + | + | +++ | -- |
| $Ce(OH)_4$ | Co—Fe | SCA25 | 26.7 | 4.6 | --- | + | ++ | -- |
| $Ti(OH)_4$ | Co—Fe | SCA26 | 19.4 | 2.6 | -- | ++ | + | -- |
| $La(OH)_3$ | Co—Fe | SCE27 | 17.0 | 5.3 | --- | --- | ++ | -- |

[a,c]see Table 1c.

[d]Weight loss of the supported catalyst (1.0 g) after 4 min of preheating from 25 to 1000° C. and a 6 min plateau at 1000° C. in a 300 ml · $min^{-1}$ $H_2$ flow.

As seen in Table 2b, the activity to produce a carbon deposit on catalysts supported on hydroxides depends on the metal and on the supported catalyst preparation "Method". The hydroxide of Al is best support to produce a carbon deposit followed by those of Mg, Ca, La, Ce and Ti. Nevertheless, SWNTs were mainly observed, by TEM, on the carbon material deposited on hydroxides of Mg followed by those of Al and Ca. The supported catalyst preparation "Method" also influences its activity to produce SWNTs and, better activities are observed for supported catalysts prepared by Method C.

Part III: Applying Mixed Hydroxides as Catalyst Supports

The mixed hydroxides based supported catalysts were prepared preferably in two steps: first, thoroughly mixing the hydroxides in a mortar or a ball mill and secondly, using the mixture instead of a pure hydroxide applying Method A. The activity of mixed hydroxides based supported catalysts were measured in identical reaction conditions. The comparison of their activities to produce MWNTs from acetylene decomposition and, to produce SWNTs from methane decomposition is reported in Tables 3a and 3b, respectively.

TABLE 3a

Relative activity of the catalysts supported on mixed hydroxides to produce nanotubes in MWNTs-700 conditions.

| Sup.$^e$ | M$^a$ | Sup. cat. name | Weight loss$^b$ (%) | Carbon deposit (%) | Quality of the carbon material from TEM$^c$ | | |
|---|---|---|---|---|---|---|---|
| | | | | | MWNTs | Am. C | Fib. |
| Ca(OH)$_2$/Mg(OH)$_2$ | Co—Fe | SCA31 | 34.1 | 122 | +++ | -- | -- |
| Ca(OH)$_2$/Al(OH)$_3$ | Co—Fe | SCA32 | 31.1 | 87 | +++ | -- | -- |
| Mg(OH)$_2$/Al(OH)$_3$ | Co—Fe | SCA33 | 34.1 | 65 | +++ | -- | -- |
| Ca(OH)$_2$/Mg(OH)$_2$/Al(OH)$_3$ | Co—Fe | SCA34 | 31.8 | 68 | +++ | -- | -- |

$^{a-c}$see Table 1c.
$^e$Binary supports are in 1:1 mass ratio, ternary supports are in 1:1:1 mass ratio, and so on.

As seen in Table 3a, the activity to produce MWNTs of catalysts supported in mixed hydroxides is higher for hydroxides of Ca/Mg followed by those of Ca/Al, Ca/Mg/Al and Mg/Al.

TABLE 3b

Relative activity of the catalysts supported on mixed hydroxides to produce nanotubes in SWNTs-1000 conditions.

| Sup.$^e$ | M$^a$ | Sup. cat. name | Weight loss$^d$ (%) | Carbon deposit (%) | Quality of the carbon material from TEM$^c$ | | | |
|---|---|---|---|---|---|---|---|---|
| | | | | | SWNTs | MWNTs | Am. C | Fib. |
| Ca(OH)$_2$/Mg(OH)$_2$ | Co—Fe | SCA31 | 34.2 | 8.5 | + | + | ++ | - |
| Ca(OH)$_2$/Al(OH)$_3$ | Co—Fe | SCA32 | 35.6 | 5.9 | -- | + | +++ | - |
| Mg(OH)$_2$/Al(OH)$_3$ | Co—Fe | SCA33 | 36.1 | 10.1 | -- | + | ++ | - |
| Ca(OH)$_2$/Mg(OH)$_2$/Al(OH)$_3$ | Co—Fe | SCA34 | 36.3 | 7.8 | --- | + | +++ | + |

$^{a,c}$see Table 1c;
$^d$see Table 2b;
$^e$see Table 3a.

As seen in Table 3b, the carbon deposit is of the same order of magnitude on all of the mixed hydroxides. Nevertheless, the activity to produce SWNTs of catalysts supported on mixed hydroxides is higher for hydroxides of Ca/Mg followed by those of Mg/Al and Ca/Al.

Part IV: Applying Carbonates as Catalyst Supports

The carbonates based supported catalysts were prepared preferably using carbonates instead of hydroxides applying Method A. The activity of the carbonate based supported catalysts were measured in different reaction conditions. The comparison of their activities to produce MWNTs from acetylene decomposition and, to produce SWNTs from methane decomposition is reported in Tables 4a and 4b, respectively.

TABLE 4a

Relative activity of the catalysts supported on carbonates to produce nanotubes in MWNTs-700 conditions.

| Sup. | Metal$^a$ | Sup. cat. name | Weight loss$^b$ (%) | Carbon deposit (%) | Quality of the carbon material from TEM$^c$ | | |
|---|---|---|---|---|---|---|---|
| | | | | | MWNTs | Am. C | Fib. |
| $CaCO_3$ | Co | SCA41 | 11.2 | 19 | +++ | -- | -- |
| $CaCO_3$ | Co—Fe | SCA42 | 7.7 | 83 | +++ | -- | -- |
| $MgCO_3$ | Co | SCA43 | 54.6 | 53 | ++ | + | − |
| $MgCO_3$ | Co—Fe | SCA44 | 49.5 | 56 | ++ | + | + |
| $Al_2(CO_3)_3$ | Co—Fe | SCA45 | 43.2 | 58 | -- | ++ | -- |
| $Ce_2(CO_3)_3$ | Co—Fe | SCA46 | 33.8 | 200 | +++ | --- | --- |
| $La_2(CO_3)_3$ | Co—Fe | SCA47 | 27.0 | 62 | ++ | + | -- |

$^{a\text{-}c}$see Table 1c.

As seen in Table 4a, the activity to produce MWNTs of mixed metals (i.e. Co—Fe) catalysts supported on carbonates is again higher than that of a single metal (i.e. Co). The carbonate of Ce is best support followed by those of Ca, La, Mg and Al.

TABLE 4b

Relative activity of the catalysts supported on carbonates to produce nanotubes in SWNTs-1000 conditions.

| Sup. | Metal$^a$ | Sup. cat. name | Weight loss$^d$ (%) | Carbon deposit (%) | Quality of the carbon material from TEM$^c$ | | | |
|---|---|---|---|---|---|---|---|---|
| | | | | | SWNTs | MWNTs | Am. C | Fib. |
| $CaCO_3$ | Co | SCA41 | 42.5 | 11.9 | − | + | ++ | − |
| $CaCO_3$ | Co—Fe | SCA42 | 40.6 | 3.2 | + | + | ++ | − |
| $MgCO_3$ | Co | SCA43 | 54.3 | 0.6 | + | -- | ++ | -- |
| $MgCO_3$ | Co—Fe | SCA44 | 56.1 | 4.6 | ++ | ++ | ++ | + |
| $Al_2(CO_3)_3$ | Co—Fe | SCA45 | 44.8 | 0.4 | --- | --- | + | -- |
| $Ce_2(CO_3)_3$ | Co—Fe | SCA46 | 34.4 | 2.0 | -- | ++ | + | − |
| $La_2(CO_3)_3$ | Co—Fe | SCA47 | 37.9 | 12.6 | --- | ++ | ++ | -- |

$^{a\text{-}c}$see Table 1c;
$^d$see Table 2b.

As seen in Table 4b, the carbon deposit on catalysts supported on carbonates is more important for La and Ca carbonates, followed by Mg, Ce and Al. Nevertheless, the activity to produce SWNTS is higher on Mg carbonate, followed by that of Ca and Ce.

Part V: Applying Mixed Carbonates as Catalyst Supports

The mixed carbonates based supported catalysts were prepared preferably in two steps: first, thoroughly mixing the carbonates in a mortar or a ball mill and secondly, using the mixture instead of the hydroxide applying Method A. The activity of the mixed carbonates based supported catalysts were measured in identical reaction conditions. The comparison of their activities to produce MWNTs from acetylene decomposition and, to produce SWNTs from methane decomposition is reported in Tables 5a and 5b, respectively.

TABLE 5a

Relative activity of the catalysts supported on mixed carbonates to produce nanotubes in MWNTs-700 conditions.

| Sup.[e] | M[a] | Sup. cat. name | Weight loss[b] (%) | Carbon deposit (%) | Quality of the carbon material from TEM[c] | | |
|---|---|---|---|---|---|---|---|
| | | | | | MWNTs | Am. C | Fib. |
| $CaCO_3$/$MgCO_3$ | Co—Fe | SCA51 | 28.8 | 16 | ++ | + | + |
| $CaCO_3$/$Al_2(CO_3)_3$ | Co—Fe | SCA52 | 26.0 | 9 | + | + | + |
| $MgCO_3$/$Al_2(CO_3)_3$ | Co—Fe | SCA53 | 29.6 | 24 | ++ | + | + |
| $CaCO_3$/$MgCO_3$/$Al_2(CO_3)_3$ | Co—Fe | SCA54 | 31.8 | 24 | + | ++ | + |

[a-c] see Table 1c;
[e] see Table 3a.

As seen in Table 5a, the activity to produce MWNTs of catalysts supported on mixed carbonates is low. Nevertheless, it is higher for carbonates of Mg/Al and of Ca/Mg/Al, followed by those of Ca/Mg and Ca/Al.

TABLE 5b

Relative activity of the catalysts supported on mixed carbonates to produce nanotubes in SWNTs-1000 conditions.

| Sup.[e] | M[a] | Sup. cat. name | Weight loss[d] (%) | Carbon deposit (%) | Quality of the carbon material from TEM[c] | | | |
|---|---|---|---|---|---|---|---|---|
| | | | | | SWNTs | MWNTs | Am. C | Fib. |
| $CaCO_3$/$MgCO_3$ | Co—Fe | SCA51 | 51.7 | 14.8 | --- | ++ | + | + |
| $CaCO_3$/$Al_2(CO_3)_3$ | Co—Fe | SCA52 | 46.0 | 0.0 | --- | --- | + | -- |
| $MgCO_3$/$Al_2(CO_3)_3$ | Co—Fe | SCA53 | 49.6 | 0.8 | --- | -- | + | -- |
| $CaCO_3$/$MgCO_3$/$Al_2(CO_3)_3$ | Co—Fe | SCA54 | 49.2 | 12.4 | --- | ++ | + | -- |

[a-c] see Table 1c;
[d] see Table 2b;
[e] see Table 3a.

As seen in Table 5b, the carbon deposit is more important on the mixed carbonates of Ca/Mg and Ca/Mg/Al. Nevertheless, the activity to produce SWNTs of catalysts supported in mixed carbonates is very low.

Part VI: Applying Mixtures of Hydroxides and Carbonates as Catalyst Supports The mixtures of hydroxides and carbonates based supported catalysts were prepared preferably in two steps: first, thoroughly mixing the hydroxides and carbonates in a mortar or a ball mill and secondly, using the mixture instead of the hydroxide applying Method A. The activity of the mixtures of hydroxides and carbonates based supported catalysts were measured in different reaction conditions. The comparison of their activities to produce MWNTs from acetylene decomposition and, to produce SWNTs from methane decomposition is reported in Tables 6a and 6b, respectively.

TABLE 6a

Relative activity of the catalysts supported on mixtures of hydroxides and carbonates to produce nanotubes in MWNTs-700 conditions.

| Sup.[e] | M[a] | Sup. cat. name | Weight loss[b] (%) | Carbon deposit (%) | Quality of the carbon material from TEM[c] | | |
|---|---|---|---|---|---|---|---|
| | | | | | MWNTs | Am. C | Fib. |
| Ca(OH)$_2$/CaCO$_3$ | Co—Fe | SCA61 | 6.2 | 123 | + | − | ++ |
| Mg(OH)$_2$/MgCO$_3$ | Co—Fe | SCA62 | 37.1 | 45 | + | − | ++ |
| Al(OH)$_3$/Al$_2$(CO$_3$)$_3$ | Co—Fe | SCA63 | 28.2 | 40 | − | −− | +++ |
| Ca(OH)$_2$/MgCO$_3$ | Co—Fe | SCA64 | 21.3 | 20 | + | + | + |
| Mg(OH)$_2$/CaCO$_3$ | Co—Fe | SCA65 | 22.7 | 20 | + | + | − |

[a-c]see Table 1c;
[e]see Table 3a.

As seen in Table 6a, the activity to produce MWNTs of catalysts supported on mixtures of hydroxides and carbonates is high for Ca/Ca, medium for Mg/Mg and low for Ca/Mg and Mg/Ca.

Herringbone carbon fibers with partly hollow cores and, of regular diameter (ca. 15-70 nm) are obtained on the mixture of hydroxides and carbonates of Al. More and more irregular carbon fibers are also obtained on mixtures of hydroxides and carbonates of Ca/Ca, Mg/Mg and Ca/Mg, respectively.

TABLE 6b

Relative activity of the catalysts supported on mixtures of hydroxides and carbonates to produce nanotubes in SWNTs-1000 conditions.

| Support[e] | M[a] | Sup. cat. name | Weight loss[d] (%) | Carbon deposit (%) | Quality of the carbon material from TEM[c] | | | |
|---|---|---|---|---|---|---|---|---|
| | | | | | SWNTs | MWNTs | Am. C | Fib. |
| Ca(OH)$_2$/CaCO$_3$ | Co—Fe | SCA61 | 35.5 | 9.5 | −− | ++ | ++ | + |
| Mg(OH)$_2$/MgCO$_3$ | Co—Fe | SCA62 | 42.7 | 5.7 | + | ++ | + | + |
| Al(OH)$_3$/Al$_2$(CO$_3$)$_3$ | Co—Fe | SCA63 | 36.0 | 19.0 | −− | ++ | ++ | − |
| Ca(OH)$_2$/MgCO$_3$ | Co—Fe | SCA64 | 38.8 | 10.5 | − | + | ++ | + |
| Mg(OH)$_2$/CaCO$_3$ | Co—Fe | SCA65 | 36.0 | 8.8 | − | ++ | ++ | + |

[a-c]see Table 1c;
[d]see Table 2b;
[e]see Table 3a.

As seen in Table 6b, the carbon deposit is of the same order of magnitude on all of the mixtures of hydroxides and carbonates. Nevertheless, the activity to produce SWNTs of catalysts supported on mixtures of hydroxides and carbonates is higher for Mg/Mg followed by those of Ca/Mg, Mg/Ca, Al/Al and Ca/Ca.

Part VII: Applying Hydroxides and/or Carbonates Mixed with Other Products as Catalyst Supports The hydroxides and/or carbonates mixed with other products based supported catalysts were prepared preferably in two steps: first, thoroughly mixing the hydroxides and/or carbonates with the other product in a mortar or a ball mill and secondly, using the mixture instead of the hydroxide applying one of the supported catalyst preparation "Methods A-H".

The other products are preferably oxides (i.e. CaO, MgO, $CeO_2$, $TiO_2$, $SiO_2$, $Al_2O_3$, . . . ), zeolites, clays, spinels, ALPOS, etc. The activity of the hydroxides and/or carbonates mixed with other products based supported catalysts were measured in different reaction conditions and, examples are given hereafter applying CaO and/or MgO. The activities of hydroxides and/or carbonates mixed with CaO (MgO) to produce MWNTs from acetylene decomposition and, to produce SWNTs from methane decomposition are reported in Tables 7a (8a) and 7b (8b), respectively.

The activities of catalysts supported on other products such as CaO, MgO and their mixtures were also measured under the same conditions and the results are reported in Tables 7a-b, 8a-b and 9a-b, respectively.

TABLE 7a

Relative activity of the catalysts supported on CaO or on hydroxides and/or carbonates mixed with CaO to produce nanotubes in MWNTs-700 conditions.

| Support[e] | M[a] | Sup. cat. name | Weight loss[b] (%) | Carbon deposit (%) | Quality of the carbon material from TEM[c] | | |
|---|---|---|---|---|---|---|---|
| | | | | | MWNTs | Am. C | Fib. |
| CaO | Co | SCA71 | 18.1 | 59 | +++ | -- | -- |
| CaO | Co | SCC71 | 16.5 | 46 | +++ | -- | -- |
| CaO | Co—Fe | SCA72 | 15.4 | 83 | +++ | -- | -- |
| CaO | Co—Fe | SCC72 | 16.9 | 173 | +++ | -- | - |
| $Ca(OH)_2$/CaO | Co—Fe | SCA73 | 4.5 | 117 | +++ | - | ++ |
| $CaCO_3$/CaO | Co—Fe | SCA74 | 18.3 | 170 | +++ | - | + |
| $Mg(OH)_2$/CaO | Co—Fe | SCA75 | 26.6 | 134 | +++ | - | - |
| $MgCO_3$/CaO | Co—Fe | SCA76 | 32.4 | 34 | +++ | -- | -- |
| $Al(OH)_3$/CaO | Co—Fe | SCA77 | 26.1 | 195 | +++ | -- | -- |
| $Al_2(CO_3)_3$/CaO | Co—Fe | SCA78 | 14.6 | 0 | + | + | + |
| $Ca(OH)_2$/$CaCO_3$/CaO | | SCA79 | 8.0 | 118 | +++ | -- | -- |

[a-c]see Table 1c;
[e]see Table 3a.

As seen in Table 7a, the activity to produce MWNTs of the catalysts depends on the catalyst preparation method and on the metal. Co—Fe/CaO prepared by Method C is very active. The activity to produce MWNTs of catalysts supported on hydroxides and/or carbonates mixed with CaO is also very high for Al hydroxide and Ca carbonate. It is high for Mg and for Ca hydroxides as well as for the ternary mixture $Ca(OH)_2$/$CaCO_3$/CaO. Low and very low activities were observed for CaO mixed with carbonates of Mg and of Al, respectively.

TABLE 7b

Relative activity of the catalysts supported on CaO or on hydroxides and/or carbonates mixed with CaO to produce nanotubes in SWNTs-1000 conditions.

| Support[e] | M[a] | Sup. cat. name | Weight loss[d] (%) | Carbon deposit (%) | Quality of the carbon material from TEM[c] | | | |
|---|---|---|---|---|---|---|---|---|
| | | | | | SWNTs | MWNTs | Am. C | Fib. |
| CaO | Co | SCA71 | 23.3 | 20.1 | -- | + | ++ | - |
| CaO | Co | SCC71 | 27.2 | 15.7 | - | + | ++ | - |
| CaO | Co—Fe | SCA72 | 19.5 | 6.1 | -- | + | ++ | - |
| CaO | Co—Fe | SCC72 | 27.9 | 13.5 | - | + | ++ | - |
| $Ca(OH)_2$/CaO | Co—Fe | SCA73 | 22.0 | 10.7 | -- | ++ | ++ | + |
| $CaCO_3$/CaO | Co—Fe | SCA74 | 30.6 | 13.8 | --- | ++ | + | - |
| $Mg(OH)_2$/CaO | Co—Fe | SCA75 | 26.6 | 3.4 | --- | ++ | ++ | -- |
| $MgCO_3$/CaO | Co—Fe | SCA76 | 45.6 | 9.3 | -- | + | + | + |
| $Al(OH)_3$/CaO | Co—Fe | SCA77 | 33.4 | 12.9 | --- | + | + | + |
| $Al_2(CO_3)_3$/CaO | Co—Fe | SCA78 | 37.1 | 0.3 | --- | --- | + | -- |
| $Ca(OH)_2$/$CaCO_3$/CaO | | SCA79 | 26.1 | 21.6 | --- | + | +++ | + |

[a,c]see Table 1c;
[d]see Table 2b;
[e]see Table 3a.

As seen in Table 7b, the carbon deposit is higher when the catalyst support is CaO alone or mixed with hydroxides and/or carbonates of Ca. Carbon deposits of the same order of magnitude are also observed using the hydroxide of Al followed by that of Mg in mixtures with CaO. Nevertheless, SWNTs were mainly observed on CaO alone (preferably prepared by Method C) or mixed with Mg carbonate or Ca hydroxide.

TABLE 8a

Relative activity of the catalysts supported on MgO or on hydroxides and/or carbonates mixed with MgO to produce nanotubes in MWNTs-700 conditions.

| Support[e] | M[a] | Sup. cat. name | Weight loss[b] (%) | Carbon deposit (%) | Quality of the carbon material from TEM[c] | | |
|---|---|---|---|---|---|---|---|
| | | | | | MWNTs | Am. C | Fib. |
| MgO | Co | SCA81 | 6.8 | 26 | -- | ++ | -- |
| MgO | Co | SCC81 | 15.2 | 32 | ++ | + | -- |
| MgO | Co | SCE81 | 12.3 | 65 | + | + | ++ |
| MgO | Co—Fe | SCA82 | 14.7 | 80 | -- | ++ | -- |
| Ca(OH)$_2$/MgO | Co—Fe | SCA83 | 15.5 | 122 | ++ | - | - |
| CaCO$_3$/MgO | Co—Fe | SCA84 | 14.1 | 11 | -- | + | -- |
| Mg(OH)$_2$/MgO | Co—Fe | SCA85 | 22.6 | 92 | ++ | + | - |
| MgCO$_3$/MgO | Co—Fe | SCA86 | 35.0 | 61 | -- | ++ | -- |
| Al(OH)$_3$/MgO | Co—Fe | SCA87 | 21.5 | 90 | -- | ++ | -- |
| Al$_2$(CO$_3$)$_3$/MgO | Co—Fe | SCA88 | 11.5 | 23 | -- | ++ | -- |
| Mg(OH)$_2$/MgCO$_3$/MgO | Co—Fe | SCA89 | 34.9 | 55 | -- | ++ | -- |

[a-c]see Table 1c;
[e]see Table 3a.

As seen in Table 8a, the activity to produce MWNTs of catalysts supported on hydroxides and/or carbonates mixed with MgO depends on the catalyst preparation method. Moreover, high carbon deposits are not directly related to MWNTs formation. High densities of MWNTs in the carbon materials were only observed for MgO mixed with Ca or Mg hydroxides, or alone (prepared by Method C).

TABLE 8b

Relative activity of the catalysts supported on MgO or on hydroxides and/or carbonates mixed with MgO to produce nanotubes in SWNTs-1000 conditions.

| Support[e] | M[a] | Sup. cat. name | Weight loss[d] (%) | Carbon deposit (%) | Quality of the carbon material from TEM[c] | | | |
|---|---|---|---|---|---|---|---|---|
| | | | | | SWNTs | MWNTs | Am. C | Fib. |
| MgO | Co | SCA81 | 11.8 | 4.5 | --- | --- | ++ | - |
| MgO | Co | SCC81 | 11.8 | 3.1 | +++ | + | -- | -- |
| MgO | Co | SCE81 | 5.8 | 5.0 | --- | --- | ++ | --- |
| MgO | Co—Fe | SCA82 | 13.4 | 4.9 | --- | --- | ++ | --- |
| Ca(OH)$_2$/MgO | Co—Fe | SCA83 | 17.0 | 6.7 | ++ | - | ++ | - |
| CaCO$_3$/MgO | Co—Fe | SCA84 | 27.1 | 12.9 | + | - | ++ | - |
| Mg(OH)$_2$/MgO | Co—Fe | SCA85 | 25.6 | 8.2 | -- | --- | ++ | --- |
| MgCO$_3$/MgO | Co—Fe | SCA86 | 35.5 | 7.9 | - | - | ++ | --- |
| Al(OH)$_3$/MgO | Co—Fe | SCA87 | 27.1 | 8.1 | ++ | - | ++ | ++ |
| Al$_2$(CO$_3$)$_3$/MgO | Co—Fe | SCA88 | 32.3 | 0.0 | --- | --- | ++ | - |
| Mg(OH)$_2$/MgCO$_3$/MgO | Co—Fe | SCA89 | 34.4 | 5.3 | + | + | ++ | + |

[a-c]see Table 1c;
[d]see Table 2b;
[e]see Table 3a.

As seen in Table 8b, the carbon deposit is higher when the catalyst support is MgO mixed with Ca carbonate. Carbon deposits of the same order of magnitude are also observed when the catalyst support is MgO alone or mixed with other supports but Al carbonate. Nevertheless, SWNTs were mainly observed on MgO alone (prepared by Method C) or mixed with hydroxides of Al or Ca. Mixtures of MgO with Ca carbonate, together or not with Mg hydroxide, are also good catalysts supports to produce SWNTs. Lower and lower activities to produce SWNTs were observed for binary mixtures of MgO with Mg carbonate and Mg hydroxide, respectively.

TABLE 9a

Relative activity of the catalysts supported on CaO/MgO to produce nanotubes in MWNTs-700 conditions.

| Support$^e$ | M$^a$ | Sup. cat. name | Weight loss$^b$ (%) | Carbon deposit (%) | Quality of the carbon material from TEM$^c$ | | |
|---|---|---|---|---|---|---|---|
| | | | | | MWNTs | Am. C | Fib. |
| CaO/MgO | Co | SCC91 | 11.7 | 27 | ++ | + | -- |
| CaO/MgO | Co—Fe | SCC92 | 8.4 | 44 | +++ | + | - |

$^{a-c}$see Table 1c;
$^e$see Table 3a.

As seen in Table 9a, the mixture CaO/MgO is a good catalyst support to produce MWNTs. Nevertheless, better activity was observed applying Co—Fe than Co.

TABLE 9b

Relative activity of the catalysts supported on CaO/MgO to produce nanotubes in SWNTs-1000 conditions.

| Support$^e$ | M$^a$ | Sup. cat. name | Weight loss$^d$ (%) | Carbon deposit (%) | Quality of the carbon material from TEM$^c$ | | | |
|---|---|---|---|---|---|---|---|---|
| | | | | | SWNTs | MWNTs | Am. C | Fib. |
| CaO/MgO | Co | SCC91 | 17.6 | 10.5 | ++ | -- | ++ | -- |
| CaO/MgO | Co—Fe | SCC92 | 20.8 | 0.2 | + | + | ++ | -- |

$^{a,c}$see Table 1c;
$^d$see Table 2b;
$^e$see Table 3a.

As seen in Table 9b, the mixture CaO/MgO is a good catalyst support to produce SWNTs. Nevertheless, better activity was observed applying Co than Co—Fe.

Part VIII: Evidences of Metal Migration from Catalyst Supports to Carbon Nanotubes During Nanotubes Synthesis Crude MWNTs samples were first analysed by PIGE and PIXE to establish their metal content and, the results are represented in Table 10a. Secondly, the spent supported catalysts were completely removed from the crude nanotubes samples by repeated dissolutions in concentrated HCl and/or in concentrated NaOH depending on the catalyst support to produce purified nanotubes. The complete removal of the spent supported catalysts was monitored by powder X ray diffraction. Afterwards, the purified nanotubes were analysed by PIXE and PIGE to measure the content of metals incorporated in the nanotubes and, the results are presented in Table 10b.

TABLE 10a

Metal content of crude MWNTs samples before removal of the spent supported catalysts.

| Support | Supported catalyst and related metal (M) from the support | | | | | | PIGE (wt %) | PIXE (wt %) | | |
|---|---|---|---|---|---|---|---|---|---|---|
| | | Al | Ca | Mg | Ce | Ti | La | M | M | Co | Fe |
| Al(OH)$_3$ | SCA1 | — | — | — | — | — | — | 18.6 | — | 1.6 | — |
| Al(OH)$_3$ | SCA2 | — | — | — | — | — | — | 8.6 | — | 0.3 | 0.3 |
| Ca(OH)$_2$ | — | SCA21 | — | — | — | — | — | — | 26.4 | 1.8 | — |

TABLE 10a-continued

Metal content of crude MWNTs samples before removal of the spent supported catalysts.

| Support | Supported catalyst and related metal (M) from the support | | | | | | PIGE (wt %) | PIXE (wt %) | | |
|---|---|---|---|---|---|---|---|---|---|---|
| | Al | Ca | Mg | Ce | Ti | La | M | M | Co | Fe |
| Ca(OH)$_2$ | — | SCA22 | — | — | — | — | — | 20.3 | 0.3 | 0.4 |
| Ca(CO$_3$) | — | SCA41 | — | — | — | — | — | 22.9 | 1.9 | — |
| Ca(CO$_3$) | — | SCA42 | — | — | — | — | — | 12.4 | 0.2 | 0.3 |
| CaO | — | SCA71 | — | — | — | — | — | 27.6 | 0.8 | — |
| CaO | — | SCA72 | — | — | — | — | — | 21.3 | 0.3 | 0.4 |
| Mg(OH)$_2$ | — | — | SCA23 | — | — | — | 22.7 | — | 2.0 | — |
| Mg(OH)$_2$ | — | — | SCA24 | — | — | — | 13.3 | — | 0.8 | 1.0 |
| Mg(CO$_3$) | — | — | SCA43 | — | — | — | 24.8 | — | 2.8 | — |
| Mg(CO$_3$) | — | — | SCA44 | — | — | — | 27.8 | — | 1.2 | 1.2 |
| MgO | — | — | SCC81 | — | — | — | 34.2 | — | 1.1 | — |
| Ce(OH)$_4$ | — | — | — | SCA25 | — | — | — | 58.8 | 0.5 | 0.6 |
| Ce$_2$(CO$_3$)$_3$ | — | — | — | SCA46 | — | — | — | 38.1 | 0.4 | 0.5 |
| Ti(OH)$_4$ | — | — | — | — | SCA26 | — | — | 34.5 | 0.9 | 1.1 |
| La(OH)$_3$ | — | — | — | — | — | SCA27 | — | 55.2 | 0.5 | 0.2 |
| La$_2$(CO$_3$)$_3$ | — | — | — | — | — | SCA47 | — | 43.2 | 0.5 | 0.4 |

TABLE 10b

Metal content of purified MWNTs samples after complete removal of the spent supported catalysts.

| Supported catalyst and related metal (M) from the support | | | | | | Puri. step | PIGE (wt %) | PIXE (wt %) | | |
|---|---|---|---|---|---|---|---|---|---|---|
| Al | Ca | Mg | Ce | Ti | La | | M | M | Co | Fe |
| SCA1 | — | — | — | — | — | f | — | — | 3.2 | — |
| SCA2 | — | — | — | — | — | f | 0.1 | — | 0.2 | 0.3 |
| | | | | | | g | 0.1 | — | 0.01 | 0.02 |
| | | | | | | h | 0.1 | — | 0.01 | 0.02 |
| — | SCA21 | — | — | — | — | i | — | 0.2 | 7.2 | — |
| — | SCA22 | — | — | — | — | i | — | 0.1 | 0.9 | 0.9 |
| — | SCA41 | — | — | — | — | i | — | 0 | 6.1 | — |
| — | SCA42 | — | — | — | — | i | — | 0 | 0.8 | 1.2 |
| — | SCA71 | — | — | — | — | i | — | 0.3 | 4.6 | — |
| — | SCA72 | — | — | — | — | i | — | 0 | 0.2 | 0.5 |
| — | — | SCA23 | — | — | — | i | 0.1 | — | 0.6 | — |
| — | — | SCA24 | — | — | — | i | 0.4 | — | 0.5 | 1.3 |
| — | — | SCA43 | — | — | — | i | 0.4 | — | 3.3 | — |
| — | — | SCA44 | — | — | — | i | 0.01 | — | 0.9 | 2.7 |
| — | — | SCC81 | — | — | — | i | 0.01 | — | 1.4 | — |
| — | — | — | SCA25 | — | — | f | — | — | 0.4 | 1.7 |
| — | — | — | SCA46 | — | — | f | — | — | 0.3 | 0.5 |
| — | — | — | — | SCA26 | — | f | — | — | 0.8 | 1.3 |
| — | — | — | — | — | SCA27 | f | — | — | 1.0 | 1.3 |
| — | — | — | — | — | SCA47 | f | — | — | 0.6 | 1.0 | f: Repeated consecutive dissolution of the spent supported catalyst in NaOH solution and in HCl solution.
g: Applying step f twice.
h: Applying step g followed by breaking of the nanotubes during 3 days in a ball mill, and applying step f again.
i: Dissolution of the spent supported catalyst in HCl solution.

As seen in Table 10b, metals from the catalyst supports (i.e. Al, Mg, Ca, Ce, La, Ti) are incorporated in the carbon nanotubes during their synthesis. As these metals are not removable by acidic dissolution and as they are also present in carbon nanotubes that do not contain encapsulated metal nanoparticles, it was deduced that they are in interstitial positions, at nanotubes defects.

GENERAL CONCLUSIONS

The catalyst support plays a very important role because it is part of the catalyst chemical environment, thus determining its activity. It also influences the catalyst particle size.

The convenient catalyst particle size (ca. 5-20 nm in diameter) for thick MWNTs synthesis involves preferably the use of a single metal (preferably Co) and water as solvent in the catalyst preparation method.

To obtain thin MWNTs, mixture of metals are more convenient and water (in microemulsion or alone) is still a favourite solvent. In fact, in mixture of metals, each individual metal is further dispersed by the other, hence decreasing the catalyst particle size down to ca. 2-12 nm in diameter.

To obtain very thin MWNTs, mixture of metals are again more convenient but alcools (i.e. ethanol, methanol) are best solvents to produce catalyst particles of ca. 1-8 nm in diameter.

Catalyst nanoparticles (preferably Co) of ca. 1-5 nm in diameter, dispersed in a catalyst support using preferably an alcool (i.e. ethanol, methanol), is best catalyst to produce SWNTs. The use of mixture of metals increases the production of other carbon structures during SWNTs synthesis.

The invention claimed is:

1. A process for the preparation of single and/or multiple-wall carbon nanotubes, comprising the following steps:

providing a catalytic system, said catalytic system comprising a catalyst and a support, said catalyst being selected from the group consisting of metals, metal oxides and metal derivatives, wherein said support is selected from the group consisting of hydroxides; carbonates; a mixture of hydroxides and carbonates; and a mixture of hydroxides, carbonates and metal oxides;

heat-treating said catalytic system in presence of an inert gas to achieve an activated catalytic system; and contacting said activated catalytic system with a hydrocarbon between 500 and 900° C. in order to prepare multi-wall nanotubes, and between 900 and 1100° C. in order to prepare single-wall nanotubes.

2. The process as claimed in claim 1, wherein the support of the catalytic system comprises carbonates selected from the group consisting of $CaCO_3$, $MgCO_3$, $Al_2(CO_3)_3$, $Ce_2(CO_3)_3$, $Ti(CO_3)_2$, $La_2(CO_3)_3$ and mixtures thereof.

3. The process as claimed in claim 1, wherein the support of the catalytic system comprises hydroxides selected from the group consisting of $Ca(OH)_2$, $Mg(OH)_2$, $Al(OH)_3$, $Ce(OH)_4$, $Ti(OH)_4$, $La(OH)_3$ and mixtures thereof.

4. The process as claimed in claim 1, wherein the support of the catalytic system comprises metal oxides selected from the group consisting of $Al_2O_3$, CaO, MgO, $CeO_2$, $TiO_2$, $SiO_2$ and mixtures thereof.

5. The process of claim 1, wherein said catalyst comprises a dispersion of metal nanoparticles at any oxidation state in said support and wherein said metals are selected from the group consisting of Fe, Co, Ni, V, Cu, Mo and Sn and mixtures thereof.

6. The process of claim 1, wherein a carbon source is selected from the group consisting of acetylene, ethylene, methane, butane and propane.

* * * * *

UNITED STATES PATENT AND TRADEMARK OFFICE
CERTIFICATE OF CORRECTION

PATENT NO. : 7,572,427 B2  Page 1 of 2
APPLICATION NO. : 10/481709
DATED : August 11, 2009
INVENTOR(S) : Nagy et al.

It is certified that error appears in the above-identified patent and that said Letters Patent is hereby corrected as shown below:

On the title page, item [56]:

At page 2, second column, line 1, please delete "bases" and insert therefore, --based--.

At page 2, second column, line 17, please delete "Adeeva," and insert therefore, --Avdeeva,--.

At column 3, line 20, please delete "colloidal," and insert therefore, --colloidal--.

At column 3, line 47 (approx), after "CCVD" please add --.--.

At column 8, line 11 (approx), please delete "$Co(AcO)_2.4H_2O$" and insert therefore, --$Co(AcO)_2 \cdot 4H_2O$--.

At column 8, line 11 (approx), please delete "$Fe(NO_3)_3.9H_2O$" and insert therefore, --$Fe(NO_3)_3 \cdot 9H_2O$--.

At column 8, line 12 (approx), please delete "$H_2O.40.0$" and insert therefore, --$H_2O \cdot 40.0$--.

At column 8, line 25, please delete "$Co(AcO)_2.4H_2O$" and insert therefore, --$Co(AcO)_2 \cdot 4H_2O$--.

At column 8, line 25, please delete "$Fe(NO_3)_3.9H_2O$" and insert therefore, --$Fe(NO_3)_3 \cdot 9H_2O$--.

At column 8, line 26, please delete "$H_2O.40.0$" and insert therefore, --$H_2O \cdot 40.0$--.

At column 8, line 41, please delete "$Co(AcO)_2.4H_2O$" and insert therefore, --$Co(AcO)_2 \cdot 4H_2O$--.

At column 8, line 41, please delete "$Fe(NO_3)_3.9H_2O$" and insert therefore, --$Fe(NO_3)_3 \cdot 9H_2O$--.

At column 8, line 67, please delete "$Co(AcO)_2.4H_2O$" and insert therefore, --$Co(AcO)_2 \cdot 4H_2O$--.

At column 8, line 67, please delete "$Fe(NO_3)_3.9H_2O$" and insert therefore, --$Fe(NO_3)_3 \cdot 9H_2O$--.

Signed and Sealed this

Seventeenth Day of August, 2010

David J. Kappos
*Director of the United States Patent and Trademark Office*

CERTIFICATE OF CORRECTION (continued)

U.S. Pat. No. 7,572,472 B2

At column 9, line 19, please delete "Co(AcO)$_2$.4H$_2$O" and insert therefore, --Co(AcO)$_2$·4H$_2$O--.

At column 9, line 19, please delete "Fe(NO$_3$)$_3$.9H$_2$O" and insert therefore, --Fe(NO$_3$)$_3$·9H$_2$O--.

At column 9, line 28, please delete "Co(AcO)$_2$.4H$_2$O" and insert therefore, --Co(AcO)$_2$·4H$_2$O--.

At column 9, line 28, please delete "Fe(NO$_3$)$_3$.9H$_2$O" and insert therefore, --Fe(NO$_3$)$_3$·9H$_2$O--.

At column 10, line 7 (approx), please delete "Co(AcO)$_2$.4H$_2$O" and insert therefore, --Co(AcO)$_2$·4H$_2$O--.

At column 10, line 9, please delete "cetyltrimethylamonium" and insert therefore, --cetyltrimethylammonium--.

At column 10, line 18, please delete "Co(AcO)$_2$.4H$_2$O" and insert therefore, --Co(AcO)$_2$·4H$_2$O--.

At column 10, line 28 (approx), please delete "Al(OH)3" and insert therefore, --Al(OH)$_3$--.

At column 11, line 25, please delete "No$_2$" and insert therefore, --NO$_2$--.

At column 12, line 20 (approx), please delete "nanopaticles," and insert therefore, --nanoparticles,--.

At column 16, line 9 (approx), please delete "MWNTS," and insert therefore, --MWNTs,--.

At column 17, line 66, please delete "manotubes" and insert therefore, --nanotubes--.

At column 30, line 3, please delete "ALPOS," and insert therefore, --ALPOs,--.

At columns 35-36, below Table 10b, please delete "f: Repeated" and insert therefore, --[f]Repeated--.

At columns 35-36, below Table 10b, please delete "g: Applying" and insert therefore, --[g]Applying--.

At columns 35-36, below Table 10b, please delete "h: Applying" and insert therefore, --[h]Applying--.

At columns 35-36, below Table 10b, please delete "i: Dissolution" and insert therefore, --[i]Dissolution--.

UNITED STATES PATENT AND TRADEMARK OFFICE
CERTIFICATE OF CORRECTION

PATENT NO. : 7,572,427 B2　　　　　　　　　　　　　　　　　　　　Page 1 of 1
APPLICATION NO. : 10/481709
DATED : August 11, 2009
INVENTOR(S) : Nagy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1305 days.

Signed and Sealed this

Seventh Day of September, 2010

David J. Kappos
*Director of the United States Patent and Trademark Office*